US012803239B2

(12) United States Patent
Takeshita

(10) Patent No.: US 12,803,239 B2
(45) Date of Patent: Nov. 17, 2026

(54) OPTICAL AMPLIFIER AND OPTICAL AMPLIFICATION METHOD

(71) Applicant: NEC Corporation, Tokyo (JP)

(72) Inventor: Hitoshi Takeshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 414 days.

(21) Appl. No.: 18/379,971

(22) Filed: Oct. 13, 2023

(65) Prior Publication Data

US 2024/0146015 A1 May 2, 2024

(30) Foreign Application Priority Data

Oct. 31, 2022 (JP) ................................ 2022-173986

(51) Int. Cl.

| | |
|---|---|
| ***H01S 3/094*** | (2006.01) |
| ***H01S 3/067*** | (2006.01) |
| ***H01S 3/13*** | (2006.01) |
| ***H01S 3/16*** | (2006.01) |

(52) U.S. Cl.

CPC .... *H01S 3/094007* (2013.01); *H01S 3/06716* (2013.01); *H01S 3/13013* (2019.08); *H01S 3/1608* (2013.01)

(58) Field of Classification Search

CPC ............... H01S 3/06754; H01S 3/1608; H01S 3/13013; H01S 3/06716; H01S 3/094007; H01S 3/094

USPC ...................................................... 359/341.3

See application file for complete search history.

(56) References Cited

U.S. PATENT DOCUMENTS

| | | | | |
|---|---|---|---|---|
| 8,462,426 | B1 * | 6/2013 | Dajani | H01S 3/094007 359/334 |
| 10,348,051 | B1 * | 7/2019 | Shah | G01S 17/34 |
| 2021/0328400 | A1 * | 10/2021 | Delavaux | H01S 3/09415 |
| 2022/0021173 | A1 * | 1/2022 | Tench | H01S 3/06754 |
| 2022/0045473 | A1 | 2/2022 | Matsumoto et al. | |
| 2022/0166179 | A1 * | 5/2022 | Takeshita | H01S 3/06737 |

FOREIGN PATENT DOCUMENTS

| | | |
|---|---|---|
| JP | 2019-532503 A | 11/2019 |
| JP | 2020-513162 A | 4/2020 |
| WO | 2017/183061 A1 | 10/2017 |

(Continued)

OTHER PUBLICATIONS

Extended European Search Report for EP Application No. 23206789.2, dated on Mar. 20, 2024.

(Continued)

*Primary Examiner* — Daniel St Cyr

(57) ABSTRACT

An optical amplifier that amplifies a wavelength multiplexing optical signal includes a first rare-earth-doped fiber, a second rare-earth-doped fiber connected in series with the first rare-earth-doped fiber, an excitation light combiner that inputs core excitation light to any of a core of the first rare-earth-doped fiber and a core of the second rare-earth-doped fiber and inputs clad excitation light to a clad of the first rare-earth-doped fiber, the clad excitation light having a wavelength different from that of the core excitation light, and an optical filter that is arranged between the first rare-earth-doped fiber and the second rare-earth-doped fiber, and transmits the wavelength multiplexing optical signal and the core excitation light and blocks the clad excitation light.

16 Claims, 14 Drawing Sheets

Fig.12

(56) References Cited

FOREIGN PATENT DOCUMENTS

| | | | |
|---|---|---|---|
| WO | 2018/135621 | A1 | 7/2018 |
| WO | 2020/264126 | A1 | 12/2020 |
| WO | 2022/091187 | A1 | 5/2022 |

OTHER PUBLICATIONS

De Gabory Emmanuel Le Taillandier et al: "Transmission of 256Gb/s PM-16QAM Signal through 7-Core MCF and MC-EDFA with Common Cladding and Variable Shared Core Pumping for Reduction of Power Consumption", 2017 European Conference on Optical Communication (ECOC), IEEE, Sep. 17, 2017 (Sep. 17, 2017), pp. 1-3.

Japanese Office Action for JP Application No. 2022-173986, mailed on Jun. 30, 2026 with English Translation.

* cited by examiner

OPTICAL AMPLIFIER AND OPTICAL AMPLIFICATION METHOD

This application is based upon and claims the benefit of priority from Japanese Patent Application No. 2022-173986, filed on Oct. 31, 2022, the disclosure of which is incorporated herein in its entirety by reference.

TECHNICAL FIELD

The present disclosure relates to an optical amplifier and an optical amplification method.

BACKGROUND ART

In an optical fiber transmission system, an optical amplifier using a rare-earth-doped fiber acquired by doping a core with a rare-earth element has been implemented. In particular, an Er-doped optical fiber amplifier (EDFA) has widely been used. The EDFA uses, as an amplification medium, an optical fiber (Er-doped optical fiber, EDF) that is acquired by doping a core with erbium (Er) being a rare-earth element. An Er ion is excited by inputting excitation light to the core of the EDF, and an optical signal propagating through the core of the EDF is amplified through induced emission. As a configuration of exciting an EDF, there have been known a configuration of inputting excitation light directly to a core of the EDF (hereinafter, referred to as "core excitation") and a configuration of inputting excitation light to a clad of the EDF (hereinafter, referred to as "clad excitation"). In a case of clad excitation, when excitation light being input to the clad traverses a core, an Er ion with which the core is doped is excited.

Meanwhile, for the purpose of expanding transmission capacity of an optical fiber transmission system, it has been examined to use a multi-core fiber (MCF) acquired by accommodating a plurality of cores in one optical fiber. The MCF is one of methods for expanding transmission capacity of an optical fiber through space division multiplexing (SDM). Further, there has been also known a multi-core-EDFA (MC-EDFA) using a multi-core-EDF (MC-EDF) as an amplification medium. Any one of the configurations including "core excitation" and "clad excitation" is also applicable to the MC-EDFA.

In relation to the present disclosure, International Patent Publication No. WO2022/091187 describes a configuration of suppressing wavelength dependence of a signal gain in a multi-core optical fiber amplifier.

An amplification property of an EDFA has wavelength dependence, and a gain spectrum, a gain, and output optical power change due to a parameter such as a length of an EDF. Excitation light intensity or an EDF length is suitably determined at a time of designing an optical transmission system in such a way as to acquire such a property as appropriate. In a long-distance optical transmission system that transmits a wavelength multiplexing optical signal, an EDFA is particularly required to have a flat gain spectrum in addition to a high gain and high output optical power. The wavelength multiplexing optical signal is an optical signal acquired by wavelength-multiplexing a plurality of optical carriers, and the wavelength multiplexing optical signal is hereinafter referred to as a "WDM signal". WDM is an abbreviation for Wavelength Division Multiplexing.

In a case in which flatness of a gain spectrum of an EDFA is not satisfactory, even when a WDM signal being input to the EDFA has a flat spectrum, a spectrum of the WDM signal being amplified is not flat. When power of the WDM signal varies depending on a wavelength, reachability of the WDM signal also varies depending on a wavelength. In order to avoid such a problem, gain spectrum compensation (gain equalization) of an EDFA has been performed by using a wavelength filter. The wavelength filter to be used herein has a wavelength property that cancels a change in flatness of a gain spectrum of the EDFA.

However, a general wavelength filter attenuates light of a WDM signal in a specific wavelength band. Thus, in order to perform gain equalization of an optical amplifier by using a wavelength filter, it is required to improve flatness of a spectrum of a WDM signal by attenuating power in other wavelength bands in such a way that the power is equivalent to power in a wavelength having minimum power. However, significant attenuation of optical intensity by a wavelength filter indicates that energy of excitation light in an EDFA is consumed without being effectively utilized. In other words, when flatness of a gain spectrum of an EDFA within a band of a WDM signal is not satisfactory, increase of power of the WDM signal that is removed by a wavelength filter causes reduction of a gain and output optical power of the EDFA.

(Object of the Disclosure)

An object of the present disclosure is to provide a technique for improving flatness of a gain spectrum, a gain, and a property of output optical power of an optical amplifier.

SUMMARY

An optical amplifier according to the present disclosure is an optical amplifier that amplifies a wavelength multiplexing optical signal, and includes:

a first rare-earth-doped fiber;

a second rare-earth-doped fiber being connected in series with the first rare-earth-doped fiber;

an excitation light combining means for inputting core excitation light to any of a core of the first rare-earth-doped fiber and a core of the second rare-earth-doped fiber and inputting clad excitation light to a clad of the first rare-earth-doped fiber, the clad excitation light having a wavelength different from that of the core excitation light; and an optical filter being arranged between the first rare-earth-doped fiber and the second rare-earth-doped fiber and being configured to transmit the wavelength multiplexing optical signal and the core excitation light and block the clad excitation light.

An optical amplification method according to the present disclosure is an amplification method to be used by an optical amplifier that includes a first rare-earth-doped fiber and a second rare-earth-doped fiber being connected in series with the first rare-earth-doped fiber and is configured to amplify a wavelength multiplexing optical signal, the optical amplification method including a procedure of:

inputting core excitation light to any of a core of the first rare-earth-doped fiber and a core of the second rare-earth-doped fiber;

inputting clad excitation light to a clad of the first rare-earth-doped fiber, the clad excitation light having a wavelength different from that of the core excitation light; and transmitting the wavelength multiplexing optical signal and the core excitation light and blocking the clad excitation light between the first rare-earth-doped fiber and the second rare-earth-doped fiber.

The present disclosure is able to improve flatness of a gain spectrum, a gain, and a property of output optical power of an optical amplifier.

BRIEF DESCRIPTION OF THE DRAWINGS

Exemplary features and advantages of the present disclosure will become apparent from the following detailed description when taken with the accompanying drawings in which.

EXAMPLE EMBODIMENT

Figure 1:
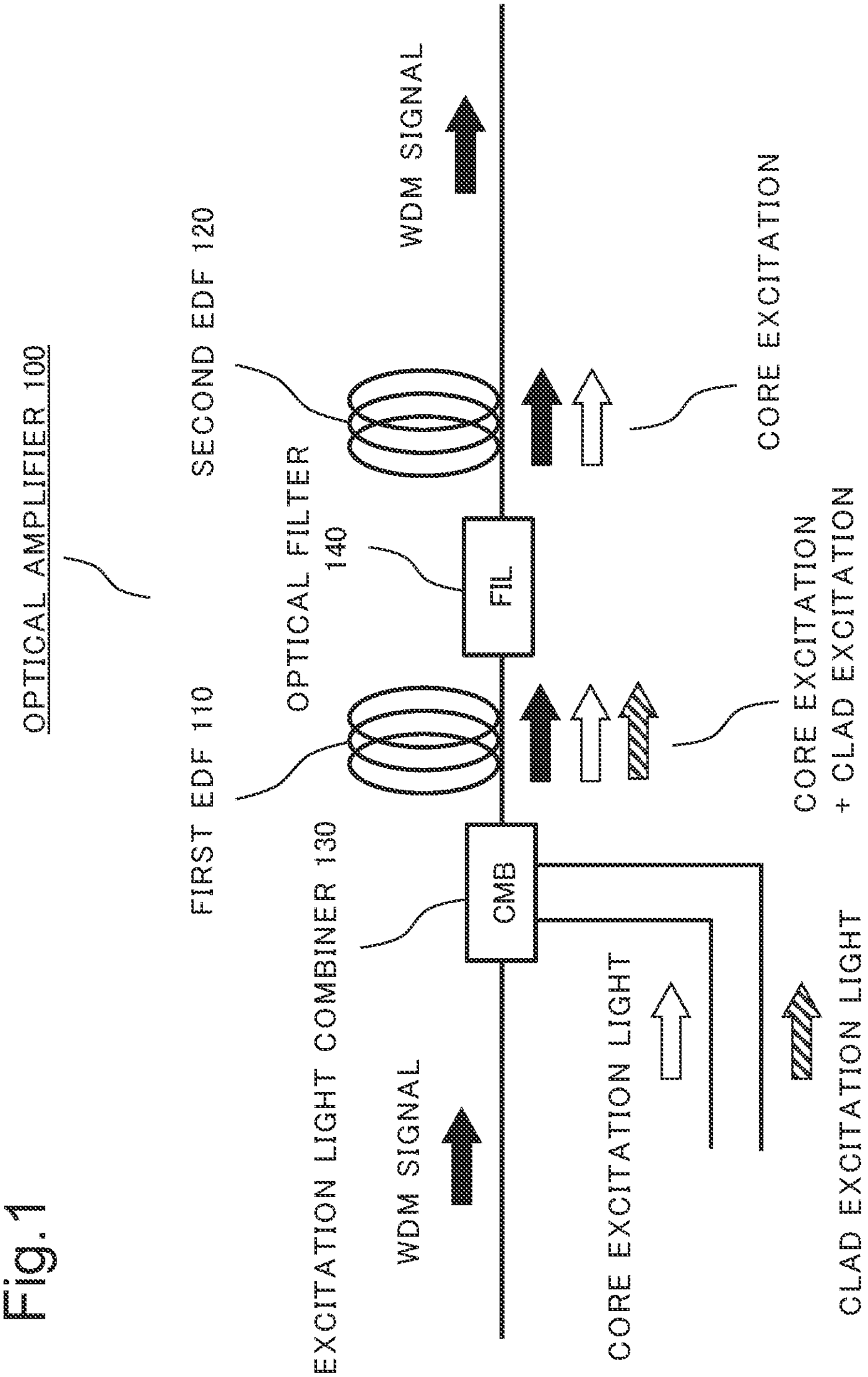
FIG. 1 is a diagram illustrating a configuration example of an optical amplifier according to a first example embodiment.

With reference to the drawings, example embodiments of the present disclosure are described below. Arrows illustrated in the drawings indicate directions of signals and the like, and are not intended to imply any specific limitations. Further, lengths and widths of the arrows do not indicate magnitude of signals and the like associated therewith. In the example embodiments and the drawings, elements that are previously described are denoted with the identical reference symbols, and overlapping description therefor is omitted in some cases.

First Example Embodiment

FIG. 1 is a diagram illustrating a configuration example of an optical amplifier 100 according to a first example embodiment of the present disclosure. The optical amplifier 100 is an erbium-doped optical fiber amplifier (EDFA). The optical amplifier 100 amplifies a wavelength multiplexing optical signal (WDM signal) that is input to the optical amplifier 100 by using a first erbium-doped fiber (Er-doped fiber, EDF) 110 and a second EDF 120 as amplification media. The optical amplifier 100 includes the first EDF 110, the second EDF 120 that is connected in series with the first EDF 110, an excitation light combiner (CBM) 130, and an optical filter (FIL) 140. The erbium-doped fiber is an example of a rare-earth-doped fiber.

Core excitation light and clad excitation light are input to the excitation light combiner 130 from the outside of the optical amplifier 100. The excitation light combiner 130 inputs the WDM signal and the core excitation light to a core of the first EDF 110, and inputs the clad excitation light that has a wavelength different from that of the core excitation light, to a clad of the first EDF 110. The core excitation light is used for core excitation of the first EDF 110 and the second EDF 120. The clad excitation light is used for clad excitation of the first EDF 110. The optical filter 140 is arranged between the first EDF 110 and the second EDF 120. The optical filter 140 has a wavelength property of transmitting the WDM signal and the core excitation light and blocking the clad excitation light of the light propagating from the first EDF 110 to the second EDF 120. The optical filter 140 is suitably a dielectric multi-layer film filter, but is not limited thereto. The optical filter 140 is only required to have the above-mentioned wavelength property, and a specific configuration of the optical filter 140 is freely selected.

In general, core excitation has an advantage of high amplification efficiency. On the other hand, clad excitation has an advantage that a high-power excitation light source can be used because an output of the excitation light source can be coupled to the EDF by a multi-mode fiber. In the optical amplifier 100 according to the present example embodiment, both core excitation and clad excitation are used.

The optical amplifier 100 thus configured can improve flatness of a gain spectrum, a gain, and a property of output optical power of the optical amplifier 100. The reason for this is as follows.

Clad excitation and core excitation have different EDF lengths for acquiring a suitable property relating to a gain and output optical power. Further, in general, it has been known that a longer EDF is required for core excitation than for clad excitation in order to acquire a suitable property relating to a gain and output optical power. For example, under a certain condition, a length of a clad excitation EDF for acquiring a desired gain and output optical power is approximately 8 m, and a length of a core excitation EDF is approximately 30 m. Thus, when both clad excitation and core excitation are used in an EDFA using one relatively short EDF, an EDF length for core excitation may not be sufficient in some cases.

Meanwhile, in general, a gain spectrum of a relatively short EDF is relatively high on a short wavelength side, and is reduced on a long wavelength side. On the other hand, it has also been known that a gain spectrum of a relatively long EDF is relatively high on a long wavelength side, and is reduced on a short wavelength side.

Figure 2:
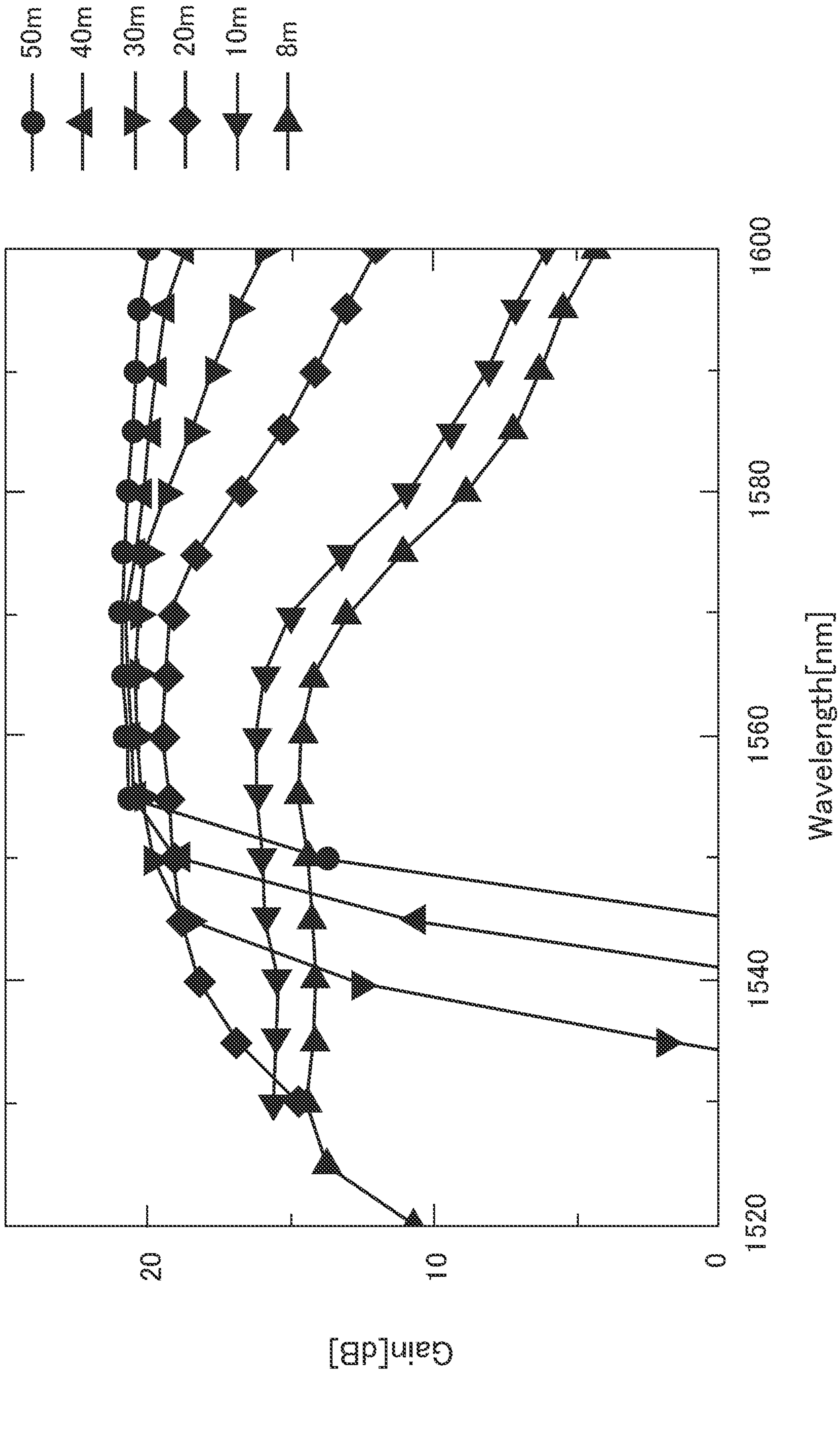
FIG. 2 is a diagram illustrating an example of a gain spectrum of an EDF.

FIG. 2 is a diagram illustrating an example of a gain spectrum of an EDF. The horizontal axis in FIG. 2 indicates a wavelength, and the vertical axis indicates a gain. In FIG. 2, property examples of some EDFs having lengths from 8 m to 50 m are given. FIG. 2 illustrates that, in EDFs of 20 m or shorter, gains are generally flat on a side of a short wavelength equal to or less than 1,560 nm, but gains are reduced on a long wavelength side. Further, FIG. 2 also illustrates that, in EDFs of 30 m or longer, gains are relatively flat on a long wavelength side, but gains on a short wavelength side are rapidly reduced as the EDF length is increased.

In the optical amplifier 100 illustrated in FIG. 1, the first EDF 110 is operated by clad excitation and core excitation. The first EDF has a length (for example, 8 m) suitable as an amplification medium for clad excitation. Meanwhile, the second EDF 120 may be relatively long (for example, approximately 20 m), and is excited only by the core excitation light transmitted through the optical filter 140. Further, the first EDF 110 and the second EDF 120 that are connected in series with each other have a suitable length as an EDF for core excitation, as compared to a case in which only the first EDF 110 is provided. With this configuration, the optical amplifier 100 is operated as a clad excitation EDFA having an EDF length equivalent to the first EDF 110 (for example, 8 m). Further, the optical amplifier 100 is operated as a core excitation EDFA having an EDF length equivalent to a sum of the first EDF 110 and the second EDF 120 (for example, 8 m+20 m=28 m). As a result, the optical amplifier 100 has a suitable property relating to flatness of a gain spectrum, a gain, and output optical power.

The first EDF 110 is relatively short, and hence a gain of the first EDF 110 operated by clad excitation is higher on a short wavelength side and lower on a long wavelength side. On the other hand, the sum of the EDF lengths of the first EDF 110 and the second EDF 120 that are operated by core excitation is greater than the EDF length of the first EDF 110. Thus, a gain spectrum of the first EDF 110 and the second EDF 120 that are operated by core excitation is higher on a long wavelength side and lower on a short wavelength side. Therefore, the optical amplifier 100 includes a configuration in which the long EDF is excited by core excitation and the short EDF is excited by clad excitation, and as a result, the difference between those gain spectra is mitigated. Further, in the optical amplifier 100, there is no need to use an optical filter for shaping a spectrum of the WDM signal for gain spectrum equalization. As a result, the optical amplifier 100 can improve flatness of a gain spectrum, a gain, and a property of output optical power.

In the optical amplifier 100, the WDM signal is input from a WDM signal input side of the first EDF 110 (in other words, a side to which the optical filter 140 is not connected). As in FIG. 1, a mode in which the excitation light is input in the same direction as an advance direction of the WDM signal is referred to as forward excitation in some cases. As compared to backward excitation to be described later, forward excitation generally has a characteristic of having a low noise figure (in other words, satisfactory noise performance).

Modification Example of First Example Embodiment

Figure 3:
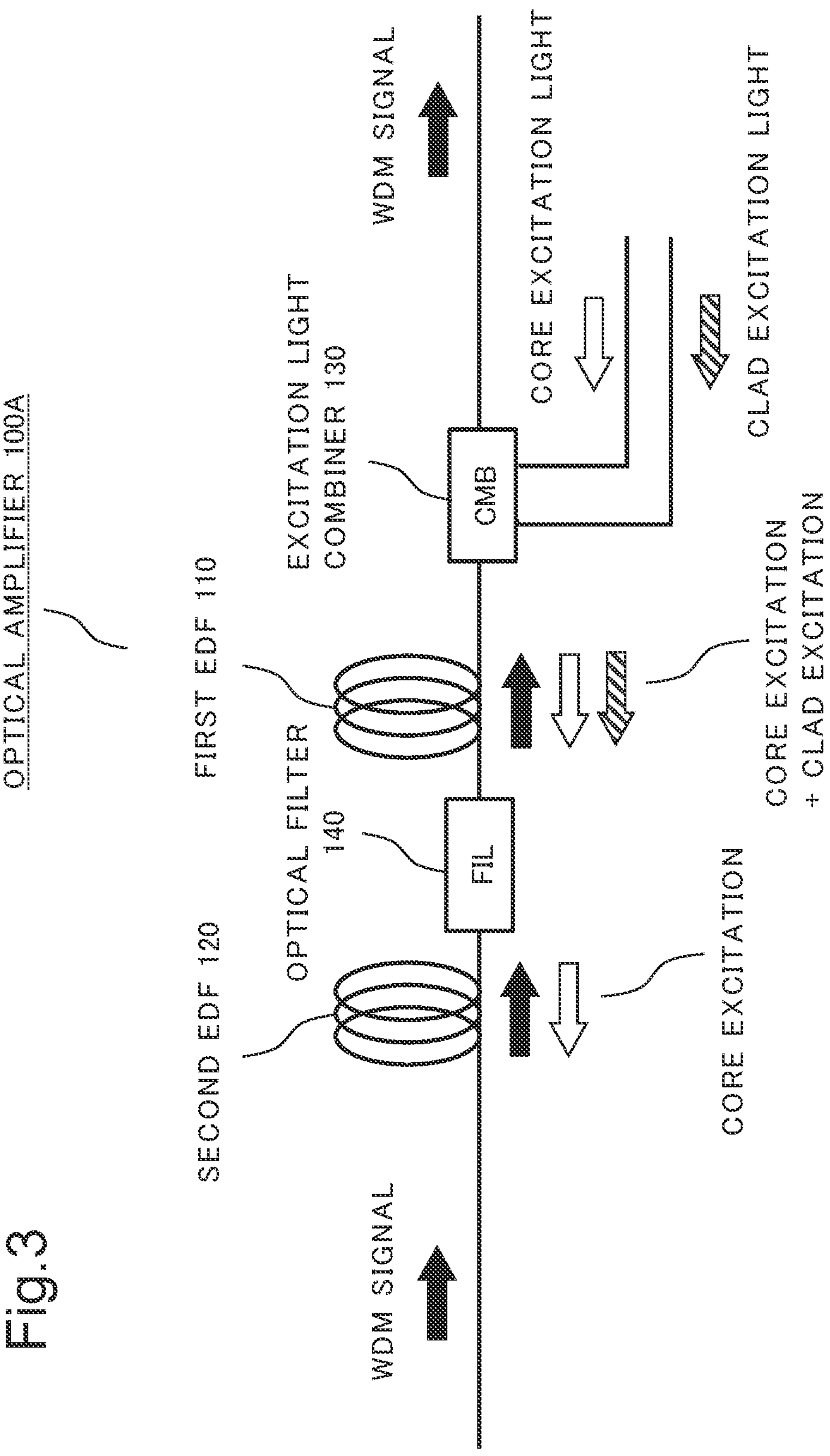
FIG. 3 is a diagram illustrating a modification example of the optical amplifier according to the first example embodiment.

FIG. 3 is a diagram illustrating a configuration example of an optical amplifier 100A being a modification example of the first example embodiment. Similarly to the optical amplifier 100, the optical amplifier 100A includes the first EDF 110, the second EDF 120, the excitation light combiner 130, and the optical filter 140. However, in the optical amplifier 100A, the second EDF 120 is arranged on a WDM signal input side. The first EDF 110 is arranged downstream of the second EDF 120 via the optical filter 140. Further, core excitation light and clad excitation light are supplied from a WDM signal output side of the first EDF. Further, the first EDF 110 is operated by core excitation and clad excitation, and the second EDF 120 is operated by core excitation light transmitted through the optical filter 140. In this manner, a configuration in which the excitation light is input in a direction opposite to an advance direction of the WDM signal is referred to as backward excitation in some cases. As compared to forward excitation, backward excitation has a characteristic of easily acquiring a high gain.

In the optical amplifier 100A, the WDM signal being input is first amplified by the second EDF 120. The WDM signal that is amplified by the second EDF 120 is transmitted through the optical filter 140, and is further amplified by the first EDF 110.

The optical amplifier 100A thus configured can also improve flatness of a gain spectrum, a gain, and a property of output optical power of the optical amplifier 100A. In other words, similarly to the optical amplifier 100, in the optical amplifier 100A, the first EDF 110 is also supplied with the core excitation light and the clad excitation light from the excitation light combiner 130. Further, similarly to the optical amplifier 100, the core excitation light that is not consumed in the first EDF 110 is supplied to the second EDF 120 via the optical filter 140. Therefore, in the optical amplifier 100A, the optical filter 140 and the second EDF 120 also exert an effect of extending a length of the EDF operated by core excitation. Thus, similarly to the optical amplifier 100, the optical amplifier 100A can improve flatness of a gain spectrum, a gain, and a property of output optical power. Further, the optical amplifier 100A is operated by backward excitation, and hence also exerts an effect of easily acquiring a high gain.

Each of the elements constituting the optical amplifiers 100 and 100A may be a single-core fiber (SCF) or a multi-core fiber (MCF). In other words, the configurations of the optical amplifiers 100 and 100A are applicable not only to a single-core erbium-doped optical fiber amplifier (SC-EDFA) but also to a multi-core erbium-doped optical amplifier (MC-EDFA). The MC-EDFA amplifies WDM signals that propagate in a plurality of cores and are different from each other, by using one multi-core EDF (MC-EDF). In the MC-EDFA, the core excitation light individually excites the cores to which the core excitation light is input. Further, the clad excitation light excites an Er ion with which each of the plurality of cores is doped. Therefore, the configurations of the optical amplifiers 100 and 100A exert similar effects not only in the SC-EDFA but also in the MC-EDFA. The multi-core EDF is an example of a multi-core rare-earth-doped fiber.

The configurations of the optical amplifiers 100 and 100A that are described above may be described as an optical amplifier given below. Further, the optical amplifier configured as below can also improve flatness of a gain spectrum, a gain, and a property of output optical power.

In other words, an optical amplifier (100, 100A) illustrated in FIGS. 1 and 3 is an optical amplifier that amplifies a wavelength multiplexing optical signal (WDM signal). The optical amplifier (100, 100A) includes a first rare-earth-doped fiber (110), a second rare-earth-doped fiber (120) that is connected in series with the first rare-earth-doped fiber, an excitation light combining means (130), and an optical filter (140).

The excitation light combiner 130 described in FIGS. 1 and 3 is an example of an excitation light combining means. In other words, the excitation light combining means (130) inputs the core excitation light to any one of a core of the first rare-earth-doped fiber (110) and a core of the second rare-earth-doped fiber (120). Further, the excitation light combining means (130) inputs the clad excitation light having a wavelength different from that of the core excitation light, to a clad of the first rare-earth-doped fiber (110). The optical filter (140) is arranged between the first rare-earth-doped fiber (110) and the second rare-earth-doped fiber (120), transmits the WDM signal and the core excitation light, and blocks the clad excitation light.

Second Example Embodiment

Figure 4:
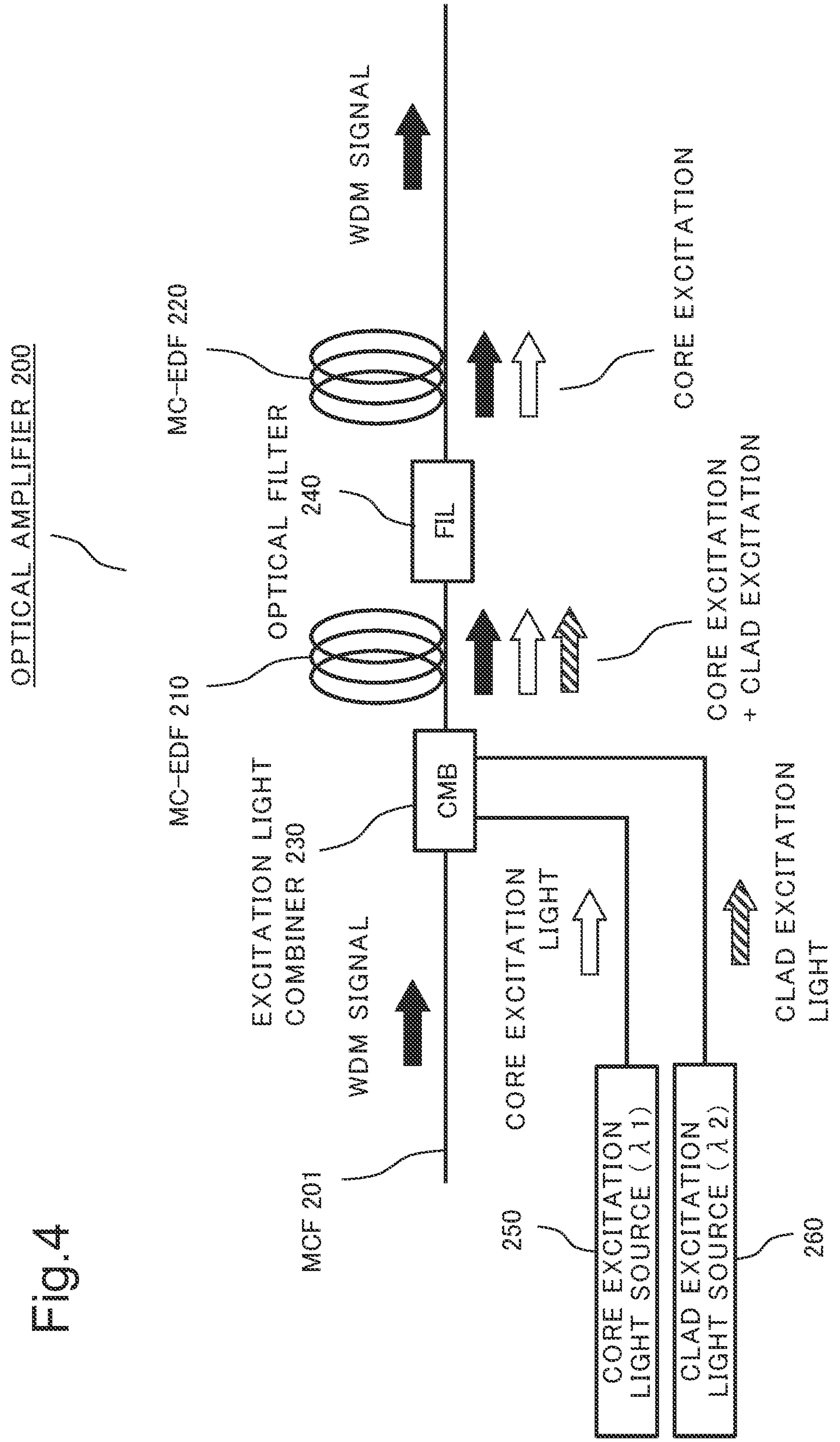
FIG. 4 is a diagram illustrating a configuration example of an optical amplifier according to a second example embodiment.

FIG. 4 is a diagram illustrating a configuration example of an optical amplifier 200 according to a second example embodiment of the present disclosure. The optical amplifier 200 is an MC-EDFA in which an optical fiber in which a WDM signal propagates is configured by an MCF. The optical amplifier 200 includes an MC-EDF 210, an MC-EDF 220, an excitation light combiner 230, an optical filter 240, a core excitation light source 250, and a clad excitation light source 260.

The MC-EDF 210 and the MC-EDF 220 are multi-core EDFs, and are connected in series with each other. The MC-EDF 210 is arranged on a WDM signal input side. The optical filter 240 is an optical wavelength filter that is arranged between the MC-EDF 210 and the MC-EDF 220. The optical filter 240 transmits light having a wavelength of the core excitation light and light having a wavelength of the WDM signal amplified by the MC-EDF 210, and block light having a wavelength of the clad excitation light.

The excitation light combiner 230 inputs the WDM signal, the core excitation light, and the clad excitation light to the MC-EDF 210. The WDM signal is input from an optical transmission path (MCF 201) to the excitation light combiner 230. The excitation light combiner 230 couples the WDM signal that is input from each of core of the MCF 201 and the core excitation light that is input from the core excitation light source 250, to a core of the MC-EDF 210. Further, the excitation light combiner 230 couples the clad excitation light that is input from the clad excitation light source 260, to a clad of the MC-EDF 210. The optical amplifier 200 is operated by forward excitation.

The core excitation light source 250 outputs the core excitation light. The core excitation light is excitation light for exciting cores of the MC-EDFs 210 and 220, and is input to the core of the MC-EDF 210. The clad excitation light source 260 outputs the clad excitation light. The clad excitation light is input to the clad of the MC-EDF 210 via the excitation light combiner 230. The clad excitation light excites the core of the MC-EDF 210 via the clad of the MC-EDF 210. For example, the core excitation light source 250 and the clad excitation light source 260 are configured by laser diodes (LDs). The LD used in the core excitation light source 250 or the clad excitation light source 260 is referred to as an excitation laser diode (excitation LD) in some cases.

A wavelength λ1 of the core excitation light and a wavelength λ2 of the clad excitation light are different from each other. Further, λ1 and λ2 do not overlap with a wavelength band of the WDM signal that is amplified by the optical amplifier 200. As a suitable combination of λ1 and λ2, for example, "λ1=0.98 μm, λλ2=1.48 μm", "λ1=0.978 μm, λ2=0.976 μm", and the like have been known. However, a wavelength other than those may be used for the excitation LD.

The optical amplifier 200 thus configured can improve flatness of a gain spectrum, a gain, and a property of output optical power of the optical amplifier 200. In other words, the clad of the MC-EDF 210 is supplied with the clad excitation light from the excitation light combiner 230, and the core of the MC-EDF 210 is supplied with the core excitation light from the excitation light combiner 230. Further, the core excitation light that is not consumed in the MC-EDF 210 is supplied to the core of the MC-EDF 220 via the optical filter 240. Meanwhile, the clad excitation light that is not consumed in the MC-EDF 210 is blocked by the optical filter 240, and hence the clad excitation light is not input to the MC-EDF 220.

As a result, the MC-EDF 220 is operated only by core excitation. In other words, in the optical amplifier 200, the optical filter 240 and the MC-EDF 220 exert an effect of extending a length of the EDF operated by core excitation. Therefore, in the optical amplifier 200, the length of the EDF operated by core excitation can be longer than the length of the EDF operated by clad excitation, and hence flatness of a gain spectrum, a gain, and a property of output optical power can be improved.

Figure 5:
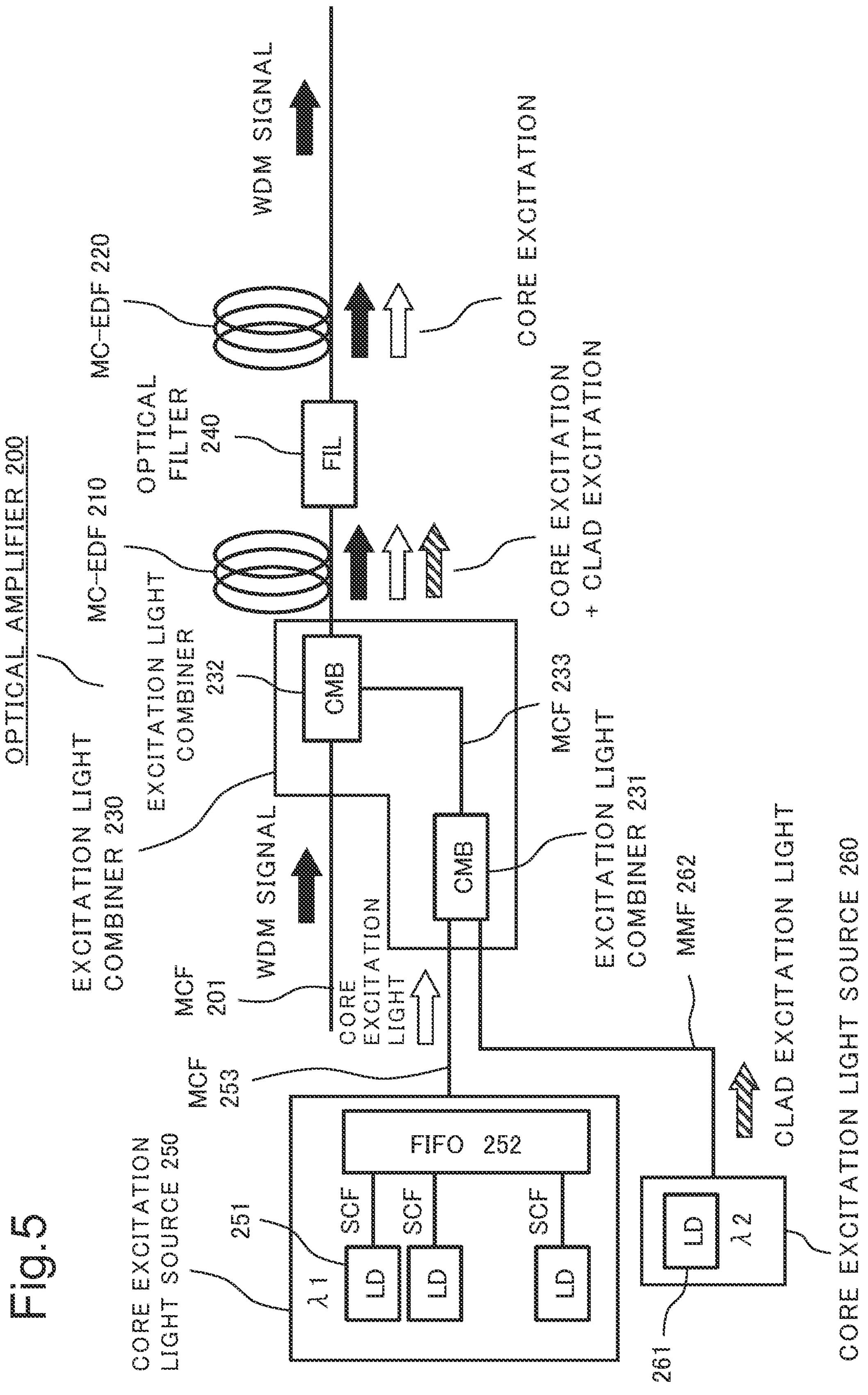
FIG. 5 is a diagram illustrating an example of a configuration of supplying excitation light to the optical amplifier.

FIG. 5 is a diagram illustrating an example of a configuration of supplying the excitation light to the optical amplifier 200. The core excitation light that is output from the core excitation light source 250 and the clad excitation light that is output from the clad excitation light source 260 are input to the MC-EDF 210 by the excitation light combiner 230. In the present example embodiment, the excitation light combiner 230 includes an excitation light combiner 231 and an excitation light combiner 232. A general configuration of the excitation light combiner 230 for connecting the core excitation light and the clad excitation light to the MC-EDF has been known, and hence, the outline thereof is described below by giving an example.

The core excitation light source 250 includes a plurality of excitation LDs 251 and one FIFO 252. A wavelength of each of the excitation LDs 251 is λ1. Each of the excitation LDs 251 outputs the core excitation light via a single-core fiber (SCF). The fan-in/fan-out (FIFO) 252 is a publicly known device, and couples each of cores of a plurality of SCFs to each of cores of an MCF 253. The clad excitation light source 260 includes an excitation LD 261 having the wavelength λ2. The clad excitation light source 260 outputs the clad excitation light through a multi-mode fiber (MMF) 262.

The excitation light combiner 230 includes the excitation light combiners 231 and 232. An MCF 233 connects the excitation light combiner 231 and the excitation light combiner 232 to each other. The core excitation light that is output from the MCF 253 is input to a core of the MCF 233 by the excitation light combiner 231. The clad excitation light that is output from the MMF 262 is input to a clad of the MCF 233 by the excitation light combiner 231. The excitation light combiner 232 connects the core of the MCF 233 to the core of the MC-EDF 210. The excitation light combiner 232 further connects the clad of the MCF 233 to the clad of the MC-EDF 210. The WDM signal propagates in each core of the MCF 201 being an MCF arranged on an input side of the optical amplifier 200, and is input to the excitation light combiner 232. The WDM signal is mixed with the core excitation light in the excitation light combiner 232, and is input to the core of the MC-EDF 210. In this manner, the function of the excitation light combiner 230 that is described with reference to FIG. 4 may be achieved by the excitation light combiners 231 and 232 that are illustrated in FIG. 5.

With this configuration, the clad excitation light is input to the clad of the MC-EDF 210, and the WDM signal and the core excitation light are input to the core of the MC-EDF 210.

Modification Example of Second Example Embodiment

Figure 6:
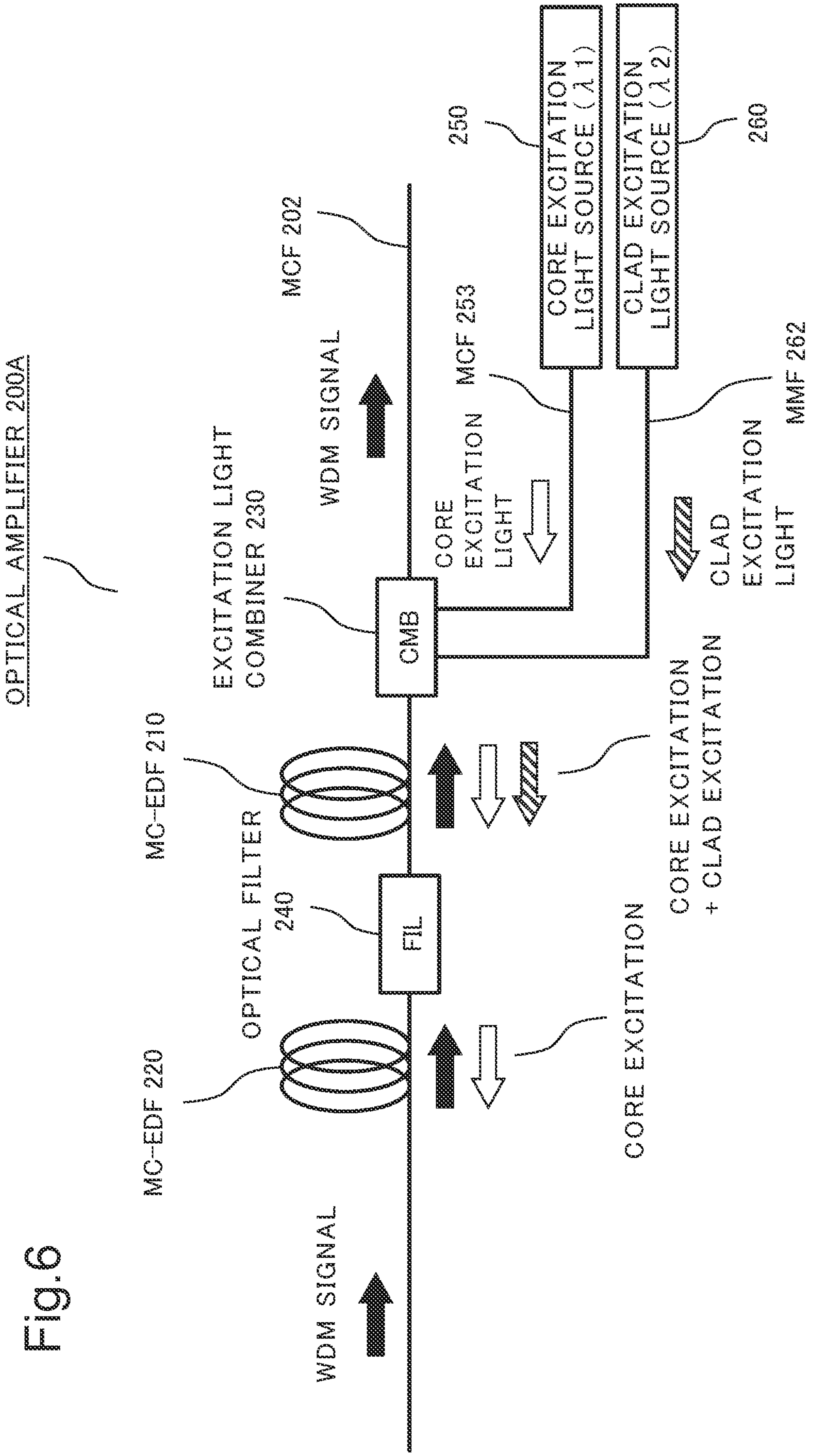
FIG. 6 is a diagram illustrating a modification example of the optical amplifier.

FIG. 6 is a diagram illustrating a configuration example of an optical amplifier 200A being a modification example of the optical amplifier 200 illustrated in FIG. 4. In the optical amplifier 200A, the MC-EDF 220 is arranged on the WDM signal input side, and the MC-EDF 210 is arranged downstream of the MC-EDF 220 (in other words, a WDM signal output side after amplification). The optical filter 240 is arranged between the MC-EDFs 210 and 220. The configurations in FIG. 5 are applicable to the core excitation light source 250 and the clad excitation light source 260.

The internal configuration of the excitation light combiner 230 may be similar to that of the optical amplifier 200. However, in the optical amplifier 200A, the excitation light combiner 230 is connected to the output side of the MC-EDF 210 in such a way as to supply the excitation light to the MC-EDF 210. The WDM signal being amplified is output to an optical transmission path (MCF 202) via the excitation light combiner 230.

The configuration of the optical amplifier 200 illustrated in FIG. 4 is forward excitation in which the core excitation light and the clad excitation light are input from the WDM signal input side. In contrast, the optical amplifier 200A adopts backward excitation in which the core excitation light and the clad excitation light are input from the WDM signal output side. Thus, as compared to the optical amplifier 200, the optical amplifier 200A has a characteristic of easily acquiring high output.

Similarly to the optical amplifier 200, the optical amplifier 200A thus configured can improve flatness of a gain spectrum, a gain, and a property of output optical power. In other words, the clad of the MC-EDF 210 is supplied with the clad excitation light from the excitation light combiner 230, and the core of the MC-EDF 210 is supplied with the core excitation light from the excitation light combiner 230. Further, the core excitation light that is not consumed in the MC-EDF 210 is supplied to the core of the MC-EDF 220 via the optical filter 240. Herein, the clad excitation light that is not consumed in the MC-EDF 210 is blocked by the optical filter 240, and hence the clad excitation light is not input to the MC-EDF 220.

As a result, the MC-EDF 220 is operated only by core excitation. In other words, in the optical amplifier 200A, the optical filter 240 and the MC-EDF 220 exert an effect of extending the length of the EDF operated by core excitation. Therefore, in the optical amplifier 200A, the length of the EDF operated by core excitation can be longer than the length of the EDF operated by clad excitation, and hence flatness of a gain spectrum, a gain, and a property of output optical power can be improved. Further, in the optical amplifier 200A, the MC-EDFs 210 and 220 are excited by backward excitation, and hence an effect of acquiring high output can be exerted as compared to the optical amplifier 200.

Third Example Embodiment

Figure 7:
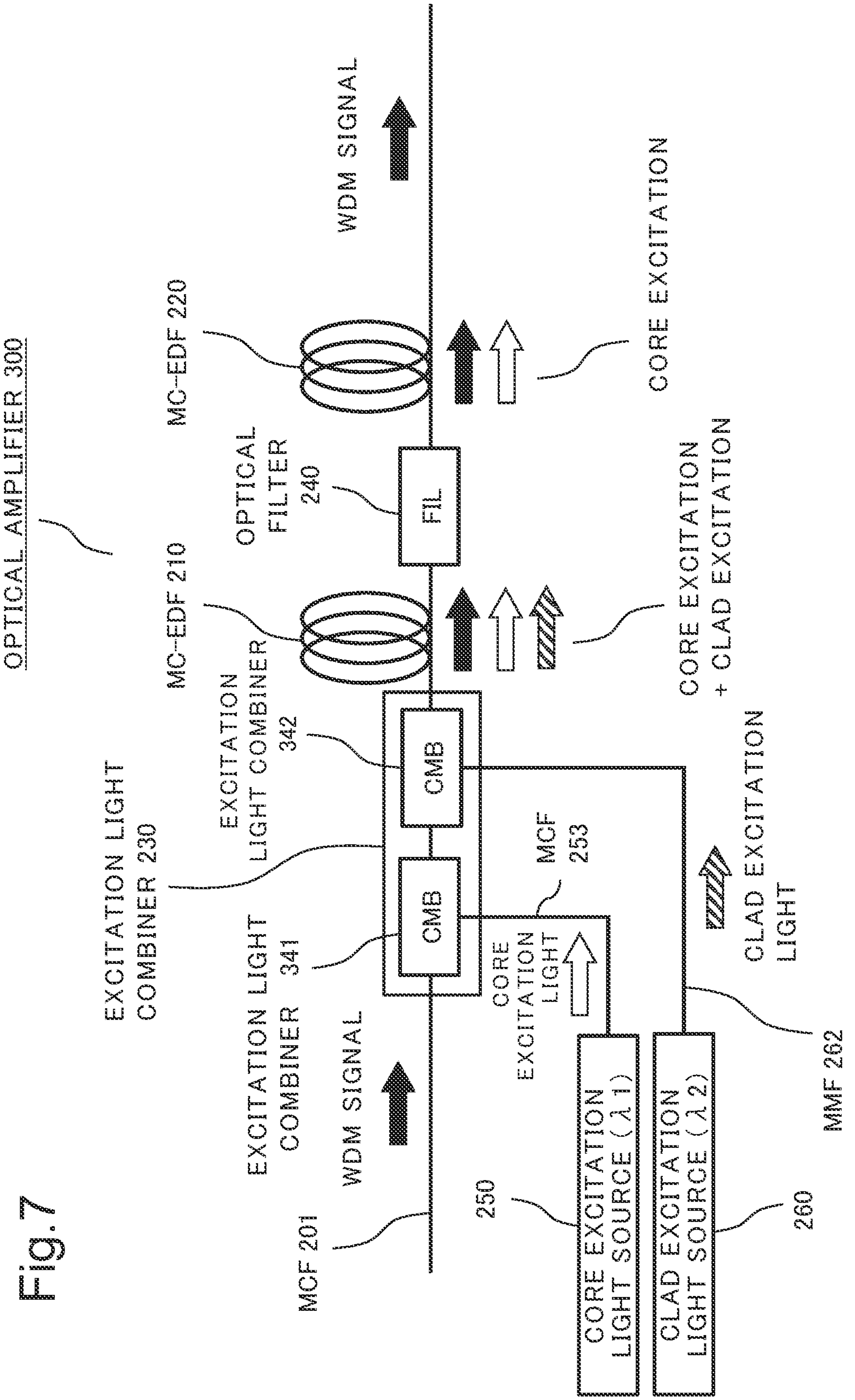
FIG. 7 is a diagram illustrating a configuration example of an optical amplifier according to a third example embodiment.

FIG. 7 is a diagram illustrating a configuration example of an optical amplifier 300 according to a third example embodiment. The optical amplifier 300 includes MC-EDFs 210 and 220, an optical filter 240, excitation light combiners 341 and 342, a core excitation light source 250, and a clad excitation light source 260. Configurations of the MC-EDFs 210 and 220 and the optical filter 240 are similar to those in the optical amplifier 200. The configurations in FIG. 5 are applicable to the core excitation light source 250 and the clad excitation light source 260.

The excitation light combiner 341 couples each of cores of the MCF 253 that is connected to an output of the core excitation light source 250, to each of cores of the MCF 201 on a WDM signal input side of the optical amplifier 300. The excitation light combiner 342 couples the MMF 262 in an output of the clad excitation light source 260 to a clad of the MC-EDF 210 on the WDM signal input side of the optical amplifier 300. The WDM signal and core excitation light are input to a core of the MC-EDF 210 via the excitation light combiners 341 and 342. Further, clad excitation light is input to the clad of the MC-EDF 210 via the excitation light combiner 342. In this manner, a function of the excitation light combiner 230 is achieved by the excitation light combiners 341 and 342 in FIG. 7. Further, in the optical amplifier 300, the WDM signal and the core excitation light are also input to the core of the MC-EDF 210, and the clad excitation light is also input to the clad. Therefore, by an operation similar to that of the optical amplifier 200, the optical amplifier 300 can improve flatness of a gain spectrum, a gain, and a property of output optical power. Positions of the excitation light combiners 341 and 342 may be switched to each other. Further, a general MCF may connect the excitation light combiner 341 and the excitation light combiner 342 to each other.

Both the core excitation light and the clad excitation light are transmitted through the excitation light combiners 231 and 232 that are illustrated in FIG. 5. Thus, the excitation light combiner 230 is required to have durability with respect to the total power of those pieces of the excitation light. In view of this, in the optical amplifier 300, the core excitation light and the clad excitation light are separately coupled to the MC-EDF 210 by the excitation light combiner 341 or 342. Thus, the excitation light combiner 341 is only required to have durability with respect to power of the core excitation light. In other words, durability of the excitation light combiner 341 with respect to optical power can be mitigated, and hence the optical amplifier 300 also exerts an effect of being capable of increasing a degree of design freedom of the excitation light combiner 230 and reducing the cost.

Modification Example of Third Example Embodiment

Figure 8:
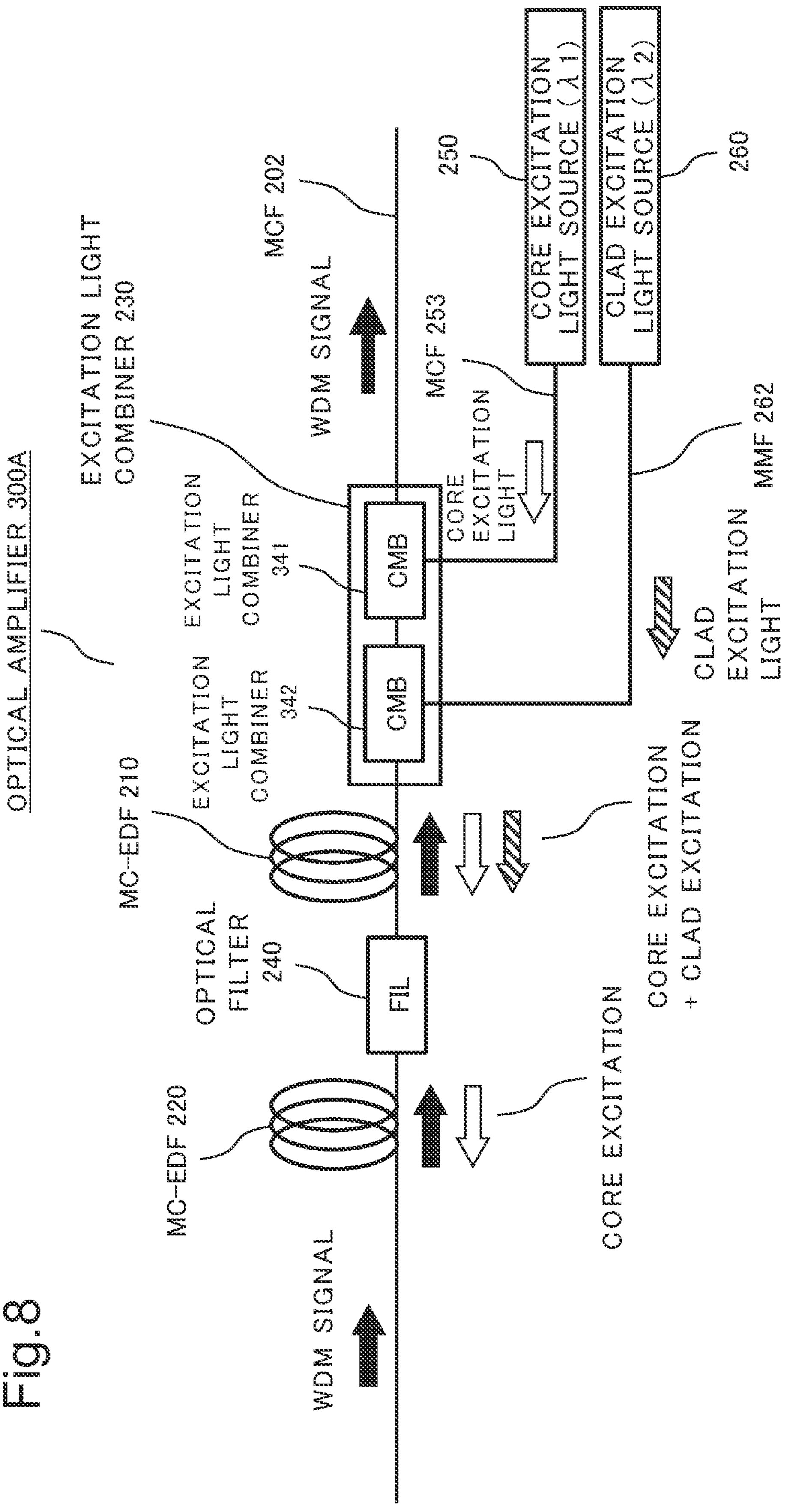
FIG. 8 is a diagram illustrating a modification example of the optical amplifier according to the third example embodiment.

FIG. 8 is a diagram illustrating a configuration example of an optical amplifier 300A being a modification example of the optical amplifier 300 according to the third example embodiment. In the optical amplifier 300A in FIG. 8, the MC-EDF 220 is arranged upstream, and the MC-EDF 210 is arranged downstream. Further, the excitation light combiners 341 and 342 are connected to the output side of the MC-EDF 210 in such a way as to supply the excitation light to the MC-EDF 210. In other words, the clad of the MC-EDF 210 is supplied with the clad excitation light from the excitation light combiner 342, and the core of the MC-EDF 210 is supplied with the core excitation light from the excitation light combiner 341. In other words, in the optical amplifier 300A, a function of the excitation light combiner 230 is also achieved by the excitation light combiners 341 and 342. Further, the core excitation light that is not consumed in the MC-EDF 210 is supplied to the core of the MC-EDF 220 via the optical filter 240. Further, the clad excitation light that is not consumed in the MC-EDF 210 is blocked by the optical filter 240, and hence the clad excitation light is not input to the MC-EDF 220.

As a result, the MC-EDF 220 is operated only by core excitation. In other words, in the optical amplifier 300A, the optical filter 240 and the MC-EDF 220 also exert an effect of extending a length of the EDF operated by core excitation. Therefore, in the optical amplifier 300A, the length of the EDF operated by core excitation can be longer than a length of the EDF operated by clad excitation, and hence flatness of a gain spectrum, a gain, and a property of output optical power can be improved. Further, the core excitation light is input to the MC-EDF 210 by the excitation light combiner 341 and the clad excitation light is input to the MC-EDF 210 by the excitation light combiner 342, and hence the optical amplifier 300A can mitigate durability of the excitation light combiner 341 with respect to optical power similarly to the optical amplifier 300.

Further, while the configuration of the optical amplifier 300 described with reference to FIG. 7 adopts forward excitation, the configuration of the optical amplifier 300A according to the present modification example adopts backward excitation. Thus, as compared to the optical amplifier 300 having the configuration of forward excitation, the optical amplifier 300A exerts an effect of easily acquiring high output.

Fourth Example Embodiment

Figure 9:
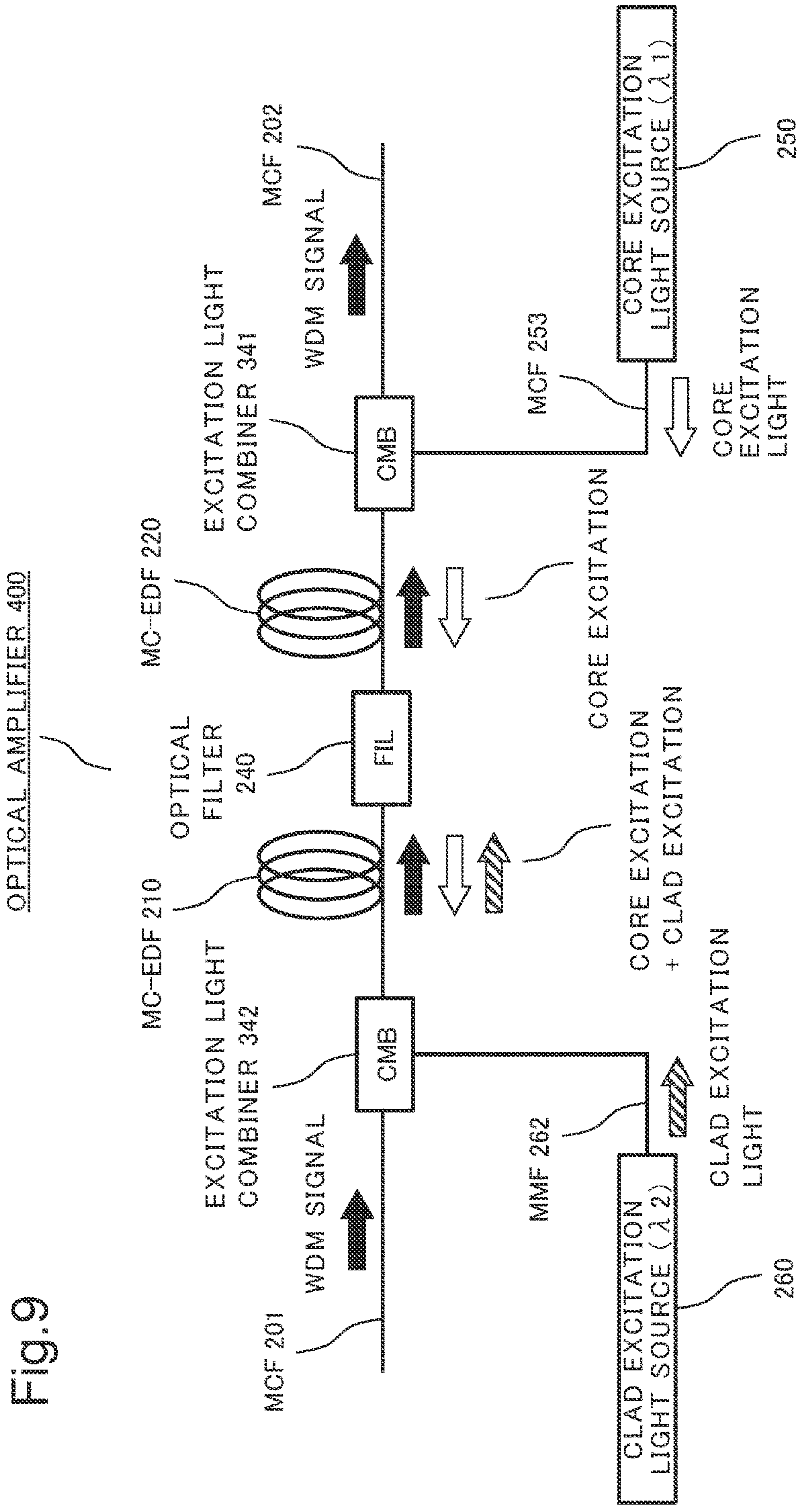
FIG. 9 is a diagram illustrating a configuration example of an optical amplifier according to a fourth example embodiment.

FIG. 9 is a diagram illustrating a configuration example of an optical amplifier 400 according to a fourth example embodiment. The optical amplifier 400 includes MC-EDFs 210 and 220, an optical filter 240, excitation light combiners 341 and 342, a core excitation light source 250, and a clad excitation light source 260. The MC-EDF 210 is arranged upstream, and the MC-EDF 220 is arranged downstream.

The excitation light combiner 341 couples each of cores of a MCF 253 that is connected to the core excitation light source 250, to each of cores of the MC-EDF 220 on an output side of the optical amplifier 400. The excitation light combiner 342 couples an MMF 262 that is connected to the clad excitation light source 260, to a clad of the MC-EDF 210 on an input side of the optical amplifier 400. Further, the excitation light combiner 342 couples a WDM signal that is input from an MCF 201, to a core of the MC-EDF 210. The WDM signal being amplified is output to an MCF 202 via the excitation light combiner 341.

In this manner, clad excitation light is input to the clad of the MC-EDF 210, and the WDM signal is input to the core of the MC-EDF 210. Further, core excitation light is input to the core of the MC-EDF 220. The core excitation light that is not consumed in the MC-EDF 220 is input to the MC-EDF 210 via the optical filter 240. Meanwhile, the clad excitation light that is not consumed in the MC-EDF 210 is blocked by the optical filter 240, and hence the clad excitation light is not input to the MC-EDF 220.

Therefore, in the optical amplifier 400, the MC-EDF 210 amplifies the WDM signal by clad excitation and core excitation, and the MC-EDF 220 amplifies the WDM signal that is amplified by the MC-EDF 210, by core excitation. In other words, similarly to the optical amplifiers according to the first to third example embodiments, the MC-EDF 220 of the optical amplifier 400 extends a length of the EDF operated by core excitation. As a result, the optical amplifier 400 can improve flatness of a gain spectrum, a gain, and a property of output optical power.

Further, in the optical amplifier 400, the core excitation light is input to each of the cores of the MC-EDF 220 by the excitation light combiner 341, and the clad excitation light is input to the clad of the MC-EDF 210 by the excitation light combiner 342. Thus, the optical amplifier 400 can mitigate durability of the excitation light combiners 341 and 342 with respect to optical power.

In addition, in the optical amplifier 400, the clad excitation light operates the MC-EDF 210 by forward excitation, and the core excitation light operates the MC-EDFs 210 and 220 by backward excitation. In this manner, by using both forward excitation and backward excitation, the optical amplifier 400 can achieve both low noise performance achieved by forward excitation and high output performance achieved by backward excitation at the same time.

Modification Example of Fourth Example Embodiment

Figure 10:
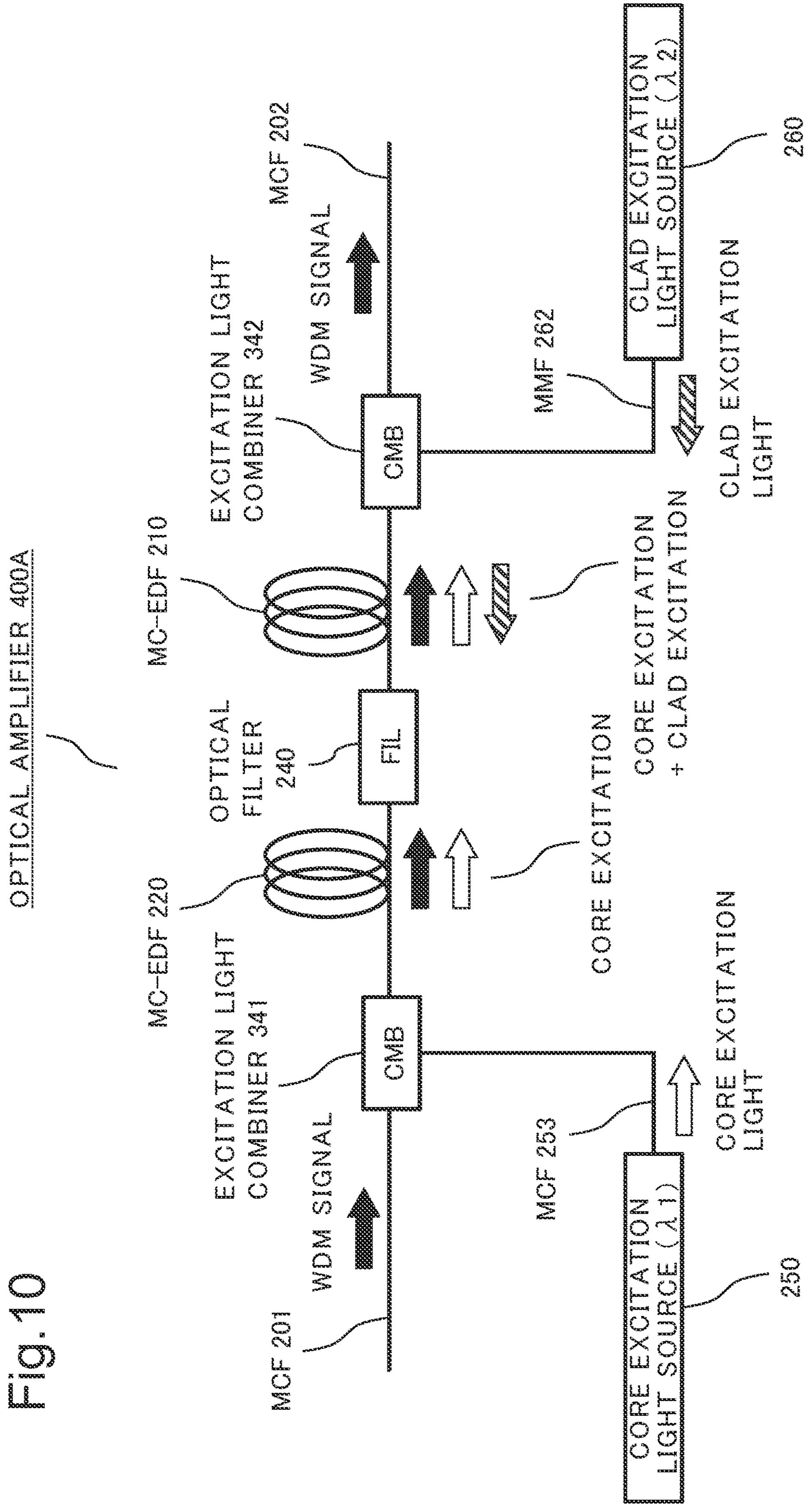
FIG. 10 is a diagram illustrating a modification example of the optical amplifier according to the fourth example embodiment.

FIG. 10 is a diagram illustrating a configuration example of an optical amplifier 400A being a modification example of the optical amplifier 400 according to the fourth example embodiment. In the optical amplifier 400A, input positions and excitation directions of the core excitation light and the clad excitation light to the MC-EDFs 210 and 220 are opposite to those in the optical amplifier 400. In other words, in the optical amplifier 400A, the core excitation light operates the MC-EDFs 210 and 220 by forward excitation, the clad excitation light operates the MC-EDF 210 by backward excitation. Similarly to the optical amplifier 400, the optical amplifier 400A thus configured can also improve flatness of a gain spectrum, a gain, and a property of output optical power. Further, the optical amplifier 400A can also mitigate durability of the excitation light combiners 341 and 342 with respect to optical power, and can achieve both low noise performance and high output performance at the same time.

Fifth Example Embodiment

Figure 11:
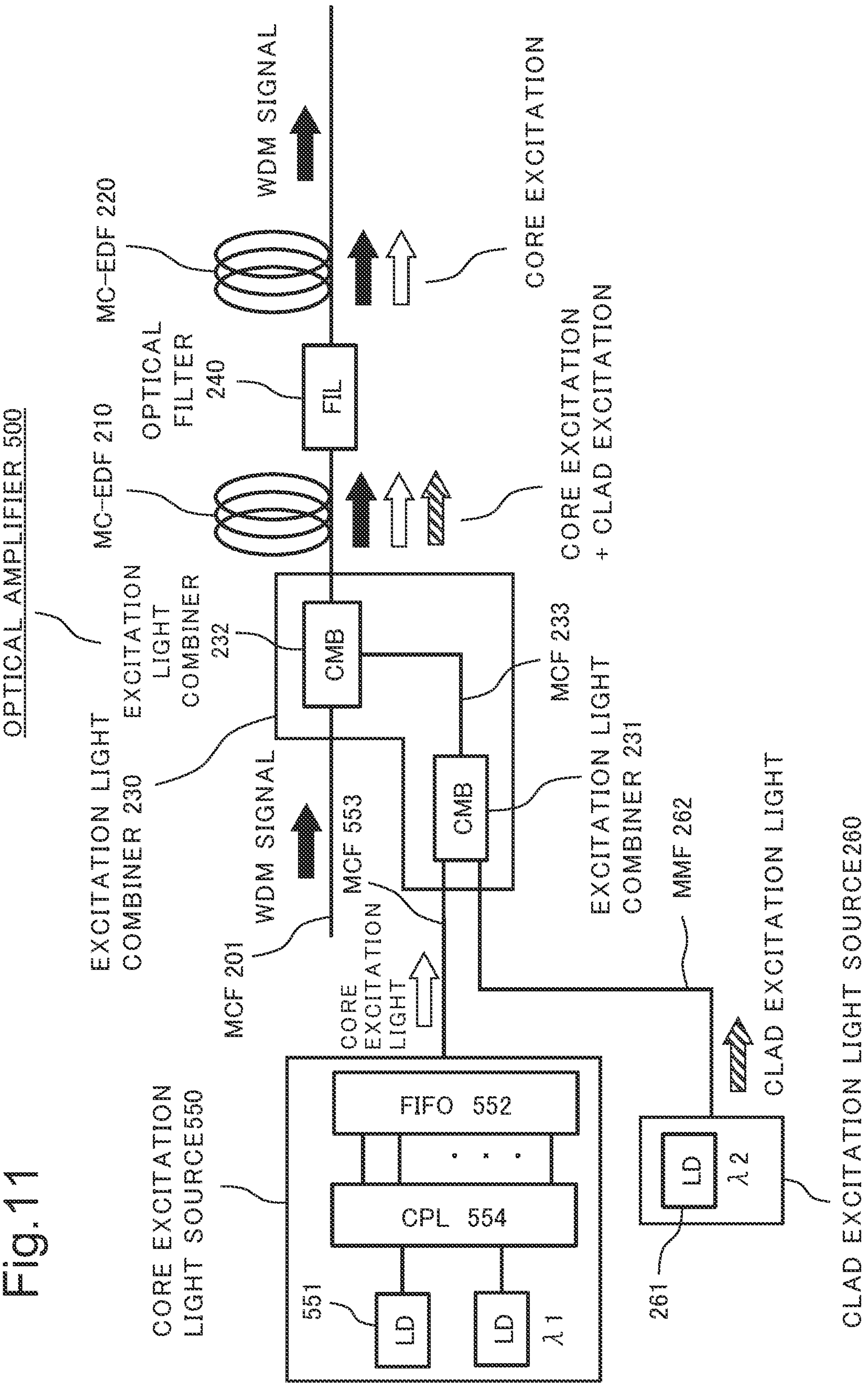
FIG. 11 is a diagram illustrating a configuration example of an optical amplifier according to a fifth example embodiment.

FIG. 11 is a diagram illustrating a configuration example of an optical amplifier 500 according to a fifth example embodiment. The optical amplifier 500 is different from the optical amplifier 200 described with reference to FIGS. 4 and 5 in that a core excitation light source 550 is included in place of the core excitation light source 250.

The core excitation light source 550 includes an LD 551, a FIFO 552, and an optical coupler (CPL) 554. The LD 551 includes a plurality of excitation LDs, and the number of excitation LDs is less than the number of cores of MC-EDFs 210 and 220. In other words, a relationship $n<m$ is satisfied, where n is the number of excitation LDs included in the LD 551, and m is the number of cores of the MC-EDFs 210 and 220. m and n are natural numbers, and FIG. 11 illustrates a case in which $n=2$ and $m\geq 3$.

The optical coupler 554 is an $n\times m$ optical coupler, and couples n pieces of the excitation light being output from the LD 551 and distributes the coupled excitation light to m SCFs. The m SCFs to which the excitation light is distributed are coupled to cores of an MCF 553 including m cores by the FIFO 552. In FIG. 11, the MCF 553 in which core excitation light propagates and an MMF 262 in which clad excitation light propagates are input to an excitation light combiner 231. Further, an output of the excitation light combiner 231 is input to the MC-EDF 210 via an MCF 233 and an excitation light combiner 232. The core excitation light source 550 may be used in place of the core excitation light source 250 described in the other example embodiments.

The optical amplifier 500 including the core excitation light source 550 is capable of exciting the cores of the MC-EDFs 210 and 220 by the fewer number of excitation LDs, and hence the cost of the optical amplifier 500 can be reduced. Further, the LD 551 is connected to each of cores of an MCF 533 via the optical coupler 554 and the FIFO 552. Thus, even when a failure occurs to any one of the plurality of excitation LDs 551, the remaining excitation LDs can continuously supply the core excitation light to each of the cores of the MC-EDFs 210 and 220. In other words, the core excitation light source 550 can improve reliability of the optical amplifier 500.

The clad excitation light source 260 may be configured by using n excitation LDs and an n×1 optical coupler that couples outputs of the excitation LDs. With this configuration, the excitation LD of the clad excitation light source 260 is redundant, and hence reliability of the clad excitation light source can be improved.

Sixth Example Embodiment

As described above, it has been known that clad excitation and core excitation have different EDF lengths suitable for amplification. In the present example embodiment, description is made on an example of a procedure of improving flatness of a gain spectrum, a gain, and a property of output optical power of an EDFA by adjusting excitation power of clad excitation and excitation power of core excitation according to a WDM signal being amplified.

Figure 12:
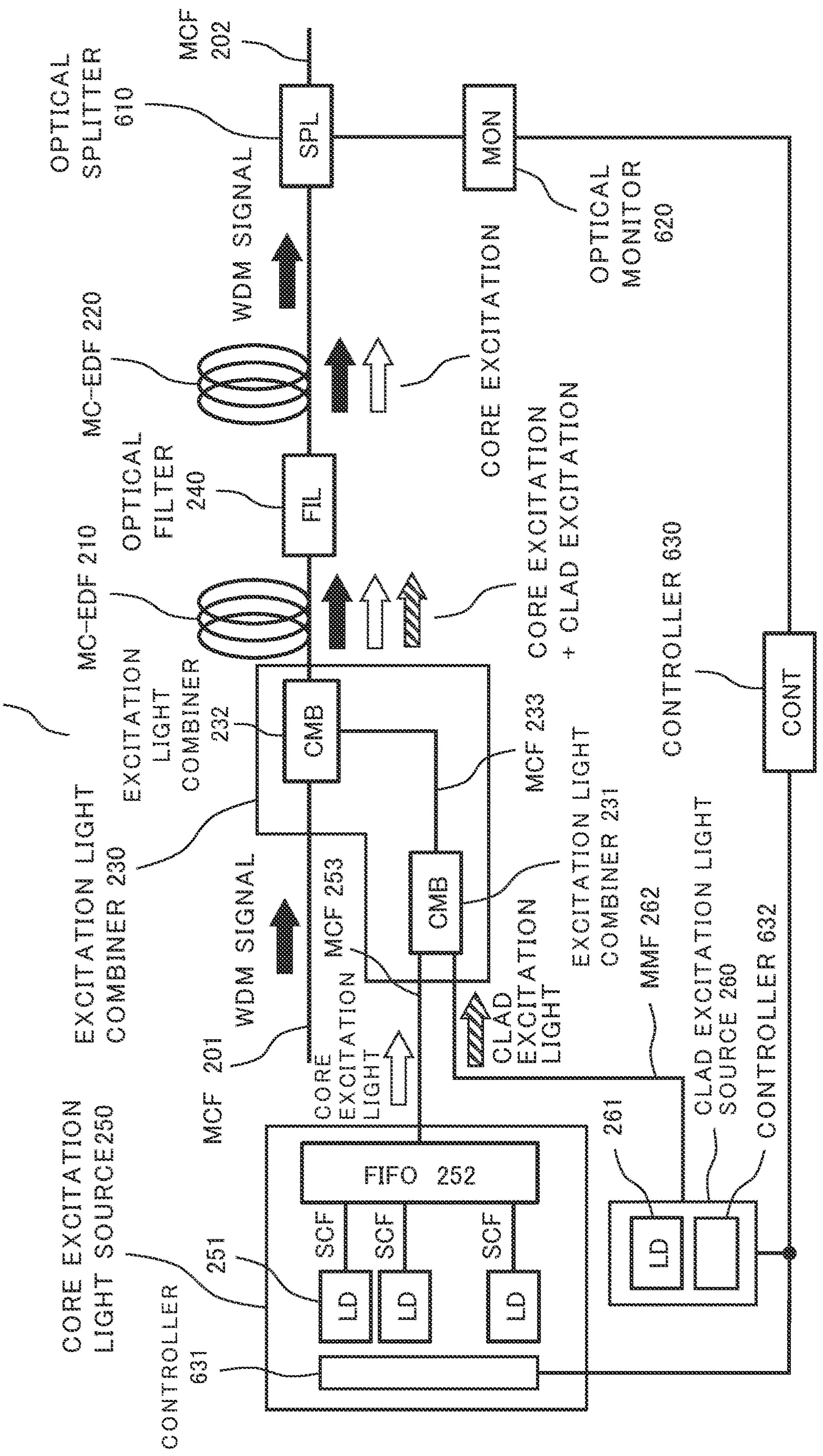
FIG. 12 is a diagram illustrating a configuration example of an optical amplifier according to a sixth example embodiment.

FIG. 12 is a diagram illustrating a configuration example of an optical amplifier 600 according to a sixth example embodiment of the present disclosure. In the optical amplifier 600, power of core excitation light and power of clad excitation light are adjusted in such a way as to enhance flatness of a spectrum shape of the WDM signal that is output from the optical amplifier 600.

The optical amplifier 600 is acquired by adding a configuration of controlling a core excitation light source 250 and a clad excitation light source 260 to the configuration of the optical amplifier 200 illustrated in FIG. 4. Power of the excitation light from the core excitation light source 250 and the clad excitation light source 260 is controlled based on information relating to a spectrum of the WDM signal that is output from the optical amplifier 200.

The optical amplifier 600 is different form the optical amplifier 200 in that an optical splitter (SPL) 610, an optical monitor (MON) 620, and a controller (CONT) 630 are included. The controller 630 controls power of the excitation light that is output from the core excitation light source 250 and the clad excitation light source 260. Thus, in the present example embodiment, the core excitation light source 250 includes a controller 631 and the clad excitation light source 260 includes a controller 632, the controllers 631 and 632 each receiving a control signal from the controller 630 and controlling an excitation LD.

The optical splitter 610 splits the WDM signal that is output from the MC-EDF 220. As the optical splitter 610, an optical directional coupler may be used. One part of the WDM signal that is split by the optical splitter 610 is transmitted to a destination of the WDM signal via an optical transmission path (MCF 202). Another part of the WDM signal being split is input to an optical monitor 620. The optical monitor 620 measures power of a predetermined wavelength in the WDM signal being input, and outputs information in which the measured power and the measured wavelength are associated with each other (hereinafter, referred to as "spectrum information") to the controller 630. The controller 630 outputs the control signal for controlling the core excitation light source 250 and the clad excitation light source 260, based on the spectrum information that is input from the optical monitor 620.

Figure 13:
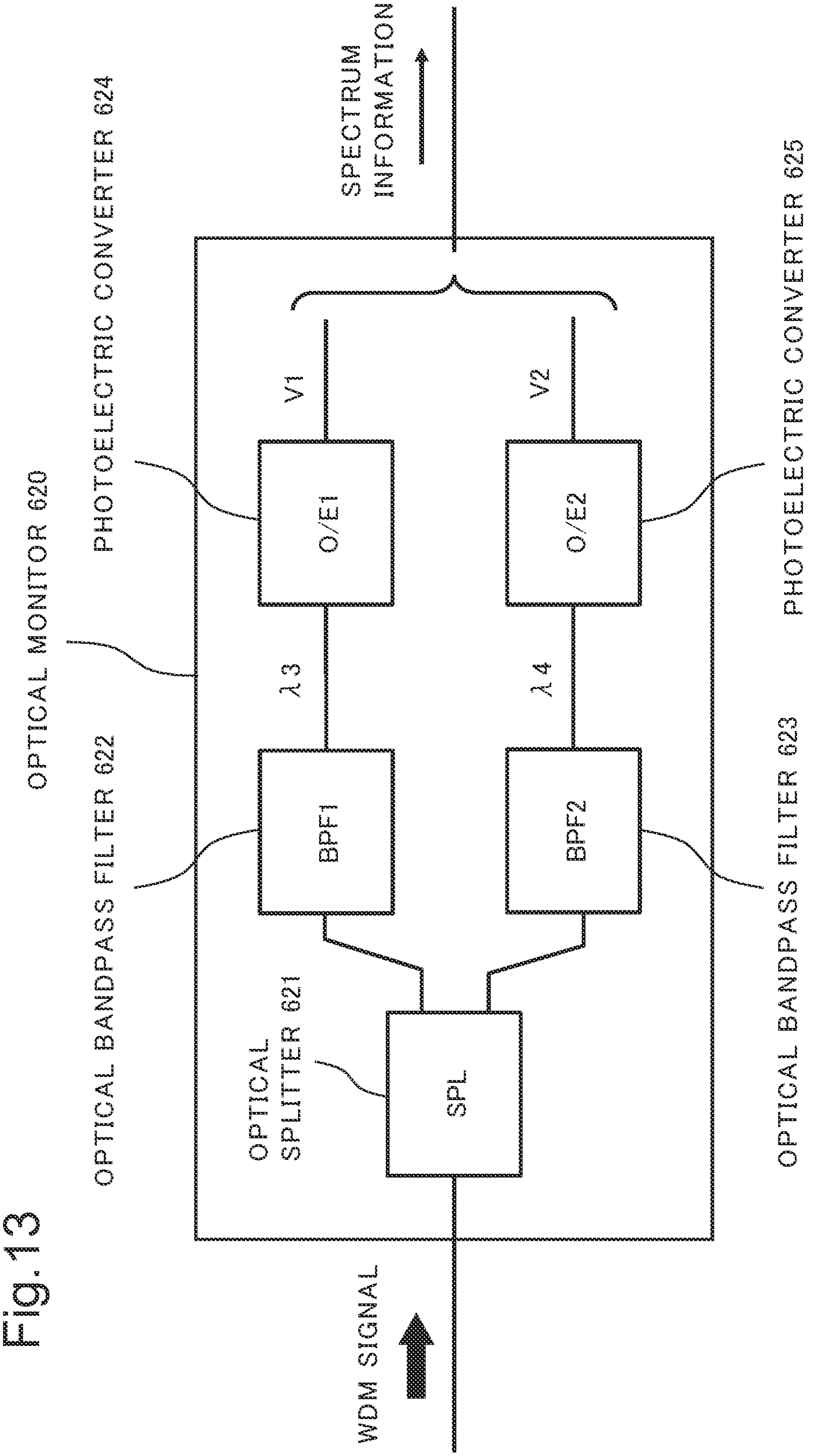
FIG. 13 is a diagram illustrating a configuration example of an optical monitor.

FIG. 13 is a diagram illustrating a configuration example of the optical monitor 620. The optical monitor 620 includes an optical splitter (SPL) 621, optical bandpass filters 622 (BPF1) and 623 (BPF2), and photoelectric converters 624 (O/E1) and 625 (O/E2). The optical splitter 621 is an optical coupler with a splitting ratio of 1:1. The WDM signal being split is input to the optical bandpass filters 622 and 623. The optical bandpass filters 622 and 623 transmit only some wavelengths in a wavelength band of the WDM signal being input. The optical bandpass filter 622 transmits light having a wavelength λ3, and the optical bandpass filter 623 transmits light having a wavelength λ4. λ3 and λ4 are wavelengths within the band of the WDM signal, and are wavelengths different from each other. For example, λ3 is a wavelength of the WDM signal on the shortest wavelength side, and λ4 is a wavelength of the WDM signal on the longest wavelength side. The photoelectric converter 624 converts the light having the wavelength λ3 that is transmitted through the optical bandpass filter 622, into an electric signal and the photoelectric converter 625 converts the light having the wavelength λ4 that is transmitted through the optical bandpass filter 623, into an electric signal. In other words, the photoelectric converters 624 and 625 output voltages V1 and V2 that have amplitudes proportional to power of the light being input. The voltages V1 and V2 are adjusted to be the same voltage with the same optical power. The optical monitor 620 outputs information in which the voltages V1 and V2 are associated with the wavelengths 23 and λ4, as the spectrum information to the controller 630.

In other words, the optical monitor 620 outputs, to the controller 630, a first voltage (V1) indicating optical power at a first wavelength (λ3) of the amplified WDM signal and a second voltage (V2) indicating optical power at a second wavelength (λA) of the amplified WDM signal.

The controller 630 controls power of the excitation light that is output from the core excitation light source 250 and power of the excitation light that is output from the clad excitation light source 260, based on the spectrum information that is input from the optical monitor 620. Thus, the controller 630 outputs the control signal to the core excitation light source 250 and the clad excitation light source 260. The controller 631 of the core excitation light source 250 and the controller 632 of the clad excitation light source 260 each control a driving electric current of the excitation LD thereof according to the control signal from the controller 630. The controller 630 is an example of a control means.

In general, in an EDFA, a gain dip is near 1,540 nm, and the gain is maximized near 1,560 nm being a wavelength at which the output is saturated. Therefore, the optical monitor 620 may detect power at 1,540 nm and power at 1,560 nm in the WDM signal being amplified, and the controller 630 may output the control signal in such a way as to minimize a difference between the voltages associated with the power at those wavelengths. With this control, the gain difference between the two wavelengths can be reduced. In other words, the controller 630 controls power of the core excitation light and power of the clad excitation light in such a way as to acquire a flatter gain spectrum of the optical amplifier 600.

Figure 14:
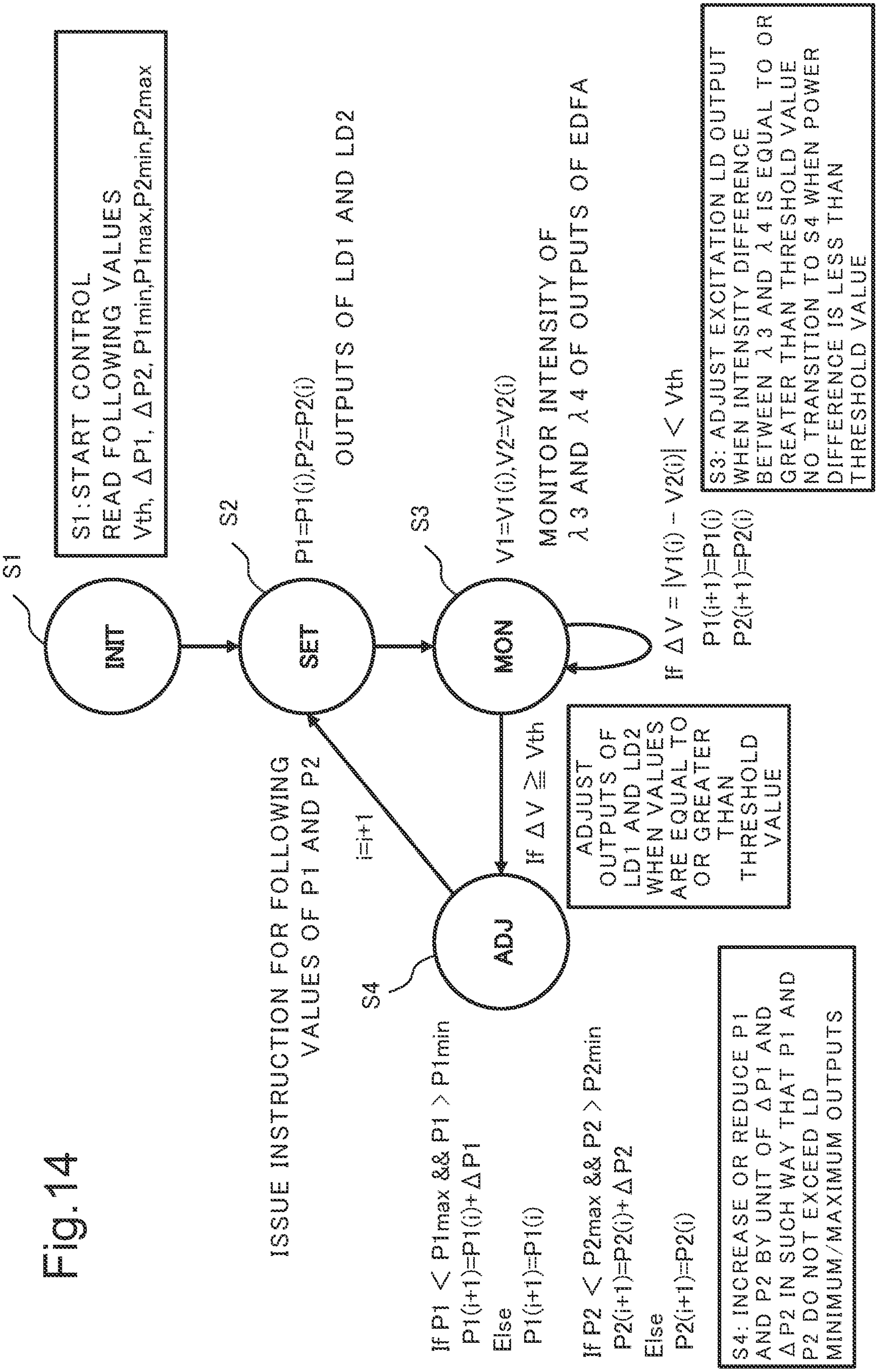
FIG. 14 is a diagram illustrating an example of transition of a state of a controller.

FIG. 14 is a diagram illustrating an example of transition of a state when the controller 630 controls the core excitation light source 250 and the clad excitation light source 260.

A state S1 (INT) is an initial state. The controller 630 reads values of Vth, ΔP1, ΔP2, P1min, P1max, P2 min, and P2max. Vth is a threshold value that is used for determination on whether control for the core excitation light source 250 and the clad excitation light source 260 is required. ΔP1 is a change amount of power of the core excitation light, and ΔP2 is a change amount of power of the clad excitation light. ΔP1 and ΔP2 are positive values. P1min is a lower limit value of power of the excitation light and P1max is an upper limit value of the power thereof, the excitation light being output from the core excitation light source 250. P2 min is a lower limit value of power of the clad excitation light and P2max is an upper limit value of the power thereof, the clad excitation light being output from the clad excitation light source 260. Those values are specified values of the system in which the optical amplifier 600 is used. Those specified values may be written in advance in a non-volatile memory of the controller 630.

In a state S2 (SET), current power P1(i) of the core excitation light source 250 is set to P1, and current power P2(i) of the clad excitation light source 260 is set to P2. i is an integer, and i=1 is satisfied directly after transition from the initial state (state S1). The controller 630 may acquire the value of P1(1) from the core excitation light source 250 and the value of P2(1) from the clad excitation light source 260. After setting P1(i) and P2(i), the state S2 is transitioned to a state S3 (MON).

In the state S3, a difference between optical power having two wavelengths contained in the spectrum information that is input from the optical monitor 620 is compared with a predetermined threshold value. Specifically, first, current WDM signal power V1(i) at the wavelength λ3 is set to V1, and current WDM signal power V2(i) at the wavelength λ4 is set to V2. Further, an absolute value ΔV being a difference between V1 and V2 is acquired. In other words, ΔV=|V1-V2| is satisfied, and ΔV indicates a level difference between the two different wavelengths in the WDM signal. Further, when ΔV is less than a threshold value Vth (ΔV<Vth), P1(i) is incremented to P1(i+1) and P2(i) is incremented to P2(i+1). In other words, P1(i+1)=P1(i) and P2(i+1)=P2(i) are satisfied. In the state S3, when ΔV is less than Vth (in other words, the difference between the optical power at the wavelength λ3 and the optical power at the wavelength λ4 is less than Vth), the state S3 is not transitioned to a state S4. In other words, when the power difference is less than the threshold value, power of the excitation light source is not adjusted.

In contrast, when ΔV is equal to or greater than the threshold value Vth (ΔV>Vth), the state S3 is transitioned to the state S4 (ADJ). In the state S4, the current power P1(i) of the core excitation light source 250 is increased or reduced by ΔP1 and the current power P2(i) of the clad excitation light source 260 is increased or reduced by ΔP2.

Herein, P1(i) is adjusted within a range from P1min to P1max that are read in the state S1. When P1(i) is a value less than P1min or a value exceeding P1max after the increase or reduction by ΔP1, P1(i) is not adjusted. Similarly, P2(i) is adjusted within a range from P2 min to P2max that are read in the state S1. When P2(i) is a value less than P2 min or a value exceeding P2max after the increase or reduction by ΔP2, P2(i) is not adjusted.

When power of the excitation light is adjusted or is not adjusted, P1 and P2 that are processed in the state S4 are input in the state S2. In this state, the value i is incremented to i+1. After that, the values of P1 and P2 are updated in the state S2, and the values of V1 and V2 are updated in the state S3.

Whether to increase or reduce each of the values of ΔP1 and ΔP2 and P1 and P2 (the values in the state S4) may be determined in advance by evaluating on the operation of the optical amplifier 600. Each of the transition from the state S3 to the state S4, the transition from the state S4 to the state S2, and the transition from the state S2 to the state S3 may be repeated until ΔV<Vth is satisfied in the state S3. In other words, adjustment of power of the core excitation light source 250 and adjustment of power of the clad excitation light source 260 are performed in such a way that a level difference between the two wavelengths in the WDM signal is less than the value associated with the threshold value Vth. Therefore, the optical amplifier 600 according to the present example embodiment adjusts power of the core excitation light source 250 and power of the clad excitation light source 260, and thus a flatter gain property of the optical amplifier 600 can be acquired.

The procedure executed by the controller 630 may be achieved when a central processing unit (CPU) included in the controller 630 executes a control program. The control program is recorded on a non-temporary recording medium that is fixed. For example, the recording medium is a semi-conductor memory or a fixed magnetic disk device, but is not limited thereto. For example, the CPU is a computer included in the controller 630.

The example embodiments of the present disclosure may be described as in the following supplementary notes, but are not limited thereto.

(Supplementary Note 1)

An optical amplifier configured to amplify a wavelength multiplexing optical signal, the optical amplifier including:

a first rare-earth-doped fiber;

a second rare-earth-doped fiber being connected in series with the first rare-earth-doped fiber;

an excitation light combining means for inputting core excitation light to any of a core of the first rare-earth-doped fiber and a core of the second rare-earth-doped fiber and inputting clad excitation light to a clad of the first rare-earth-doped fiber, the clad excitation light having a wavelength different from that of the core excitation light; and an optical filter being arranged between the first rare-earth-doped fiber and the second rare-earth-doped fiber and being configured to transmit the wavelength multiplexing optical signal and the core excitation light and block the clad excitation light.

(Supplementary Note 2)

The optical amplifier according to supplementary note 1, wherein both the first rare-earth-doped fiber and the second rare-earth-doped fiber are erbium-doped fibers.

(Supplementary Note 3)

The optical amplifier according to supplementary note 1 or 2, wherein the excitation light combining means inputs the core excitation light and the clad excitation light to the first rare-earth-doped fiber by forward excitation or backward excitation.

(Supplementary Note 4)

The optical amplifier according to supplementary note 1 or 2, wherein the excitation light combining means inputs the clad excitation light to the first rare-earth-doped fiber by one of forward excitation and backward excitation, and inputs the core excitation light to the second rare-earth-doped fiber by another of forward excitation and backward excitation.

(Supplementary Note 5)

The optical amplifier according to any one of supplementary notes 1 to 4, further including: a core excitation light source configured to supply the core excitation light to the excitation light combining means; and a clad excitation light source configured to supply the clad excitation light to the excitation light combining means.

(Supplementary Note 6)

The optical amplifier according to any one of supplementary notes 1 to 5, wherein each of the first rare-earth-doped fiber and the second rare-earth-doped fiber is a multi-core rare-earth-doped fiber including m cores, and the excitation light combining means inputs the core excitation light to m cores of the first rare-earth-doped fiber or the second rare-earth-doped fiber, where m is an integer equal to or greater than 2.

(Supplementary Note 7)

The optical amplifier according to supplementary note 6, further including:

a core excitation light source configured to supply the core excitation light to the excitation light combining means; and a clad excitation light source configured to supply the clad excitation light to the excitation light combining means, wherein the core excitation light source includes n excitation laser diodes and an n×m optical coupler configured to distribute output from then laser diodes to m, where n is less than m.

(Supplementary Note 8)

The optical amplifier according to any one of supplementary notes 1 to 7, further including:

an optical monitor configured to output a first voltage that indicates optical power at a first wavelength of the wavelength multiplexing optical signal being amplified and a second voltage that indicates optical power at a second wavelength of the wavelength multiplexing optical signal being amplified; and a control means for outputting a control signal for controlling at least one of power of the core excitation light and power of the clad excitation light when an absolute value of a difference between the first voltage and the second voltage is equal to or greater than a predetermined threshold value.

(Supplementary Note 9)

The optical amplifier according to supplementary note 8, wherein the control means outputs the control signal in such a way as to reduce an absolute value of a difference between the first voltage and the second voltage.

(Supplementary Note 10)

The optical amplifier according to supplementary note 8 or 9, wherein the control means outputs the control signal when each of power of the core excitation light and power of the clad excitation light falls within a predetermined range.

(Supplementary Note 11)

An optical amplification method to be used by an optical amplifier that includes a first rare-earth-doped fiber and a second rare-earth-doped fiber being connected in series with the first rare-earth-doped fiber and is configured to amplify a wavelength multiplexing optical signal, the optical amplification method including:

inputting core excitation light to any of a core of the first rare-earth-doped fiber and a core of the second rare-earth-doped fiber;

inputting clad excitation light to a clad of the first rare-earth-doped fiber, the clad excitation light having a wavelength different from that of the core excitation light; and transmitting the wavelength multiplexing optical signal and the core excitation light and blocking the clad excitation light between the first rare-earth-doped fiber and the second rare-earth-doped fiber.

(Supplementary Note 12)

The optical amplification method according to supplementary note 11, wherein both the first rare-earth-doped fiber and the second rare-earth-doped fiber are erbium-doped fibers.

(Supplementary Note 13)

The optical amplification method according to supplementary note 11 or 12, further including:

outputting a first voltage that indicates optical power at a first wavelength of the wavelength multiplexing optical signal being amplified and a second voltage that indicates optical power at a second wavelength of the wavelength multiplexing optical signal being amplified; and controlling, when an absolute value of a difference between the first voltage and the second voltage is equal to or greater than a predetermined threshold value, at least one of power of the core excitation light and power of the clad excitation light.

(Supplementary Note 14)

The optical amplification method according to supplementary note 13, further including controlling at least one of power of the core excitation light and power of the clad excitation light in such a way as to reduce an absolute value of a difference between the first voltage and the second voltage.

(Supplementary Note 15)

A control program to be used by an optical amplifier configured to amplify a wavelength multiplexing optical signal, wherein the optical amplifier includes:

a first rare-earth-doped fiber;

a second rare-earth-doped fiber being connected in series with the first rare-earth-doped fiber;

an excitation light combining means for inputting core excitation light to any of a core of the first rare-earth-doped fiber and a core of the second rare-earth-doped fiber and inputting clad excitation light to a clad of the first rare-earth-doped fiber, the clad excitation light having a wavelength different from that of the core excitation light;

an optical filter being arranged between the first rare-earth-doped fiber and the second rare-earth-doped fiber and being configured to transmit the wavelength multiplexing optical signal and the core excitation light and block the clad excitation light; and an optical monitor configured to output a first voltage that indicates optical power at a first wavelength of the wavelength multiplexing optical signal being amplified and a second voltage that indicates optical power of a second wavelength of the wavelength multiplexing optical signal being amplified, wherein the control program causes a computer of the optical amplifier to execute a procedure of outputting a control signal for controlling at least one of power of the core excitation light and power of the clad excitation light when an absolute value of a difference between the first voltage and the second voltage is equal to or greater than a predetermined threshold value.

(Supplementary Note 16)

The control program according to supplementary note 15, wherein both the first rare-earth-doped fiber and the second rare-earth-doped fiber are erbium-doped fibers.

(Supplementary Note 17)

The control program according to supplementary note 15 or 16, causing a computer of the optical amplifier to execute a procedure of outputting the control signal in such a way as to reduce an absolute value of a difference between the first voltage and the second voltage.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims. For example, the optical amplifiers described in the example embodiments also disclose example embodiments of an optical amplification method, an optical transmission method, and an optical sending method.

Further, the configurations described in the example embodiments are not necessarily exclusive from one another. The actions and the effects of the present disclosure may be achieved by a configuration acquired by combining all or some of the example embodiments described above.

REFERENCE SIGNS LIST

100, 100A, 200, 200A, 300, 300A Optical amplifier
110 First EDF
120 Second EDF
130, 230, 231, 232, 341, 342 Excitation light combiner
140, 240 Optical filter
201, 233, 253, 553, 533 MCF
210, 220 EDF
250, 550 Core excitation light source
260 Clad excitation light source
262 Multi-mode fiber
400, 400A, 500, 600 Optical amplifier
554 Optical coupler
610 Optical splitter
620 Optical monitor
621 Optical splitter
622, 623 Optical bandpass filter
624, 625 Photoelectric converter
630, 631, 632 Controller

The invention claimed is:

1. An optical amplifier configured to amplify a wavelength multiplexing optical signal, the optical amplifier comprising:
- a first rare-earth-doped fiber;
- a second rare-earth-doped fiber connected in series with the first rare-earth-doped fiber;
- an excitation light combiner configured to input core excitation light to any of a core of the first rare-earth-doped fiber and a core of the second rare-earth-doped fiber and input clad excitation light to a clad of the first rare-earth-doped fiber, the clad excitation light having a wavelength different from that of the core excitation light;
- an optical filter arranged between the first rare-earth-doped fiber and the second rare-earth-doped fiber and configured to transmit the wavelength multiplexing optical signal and the core excitation light and block the clad excitation light;
- an optical monitor configured to output a first voltage that indicates optical power at a first wavelength of the wavelength multiplexing optical signal amplified and a second voltage that indicates optical power at a second wavelength of the wavelength multiplexing optical signal amplified; and
- a controller configured to output a control signal for controlling at least one of power of the core excitation light and power of the clad excitation light when an absolute value of a difference between the first voltage and the second voltage is equal to or greater than a predetermined threshold value.

2. The optical amplifier according to claim 1, wherein both the first rare-earth-doped fiber and the second rare-earth-doped fiber are erbium-doped fibers.

3. The optical amplifier according to claim 1, wherein the excitation light combiner inputs the core excitation light and the clad excitation light to the first rare-earth-doped fiber by forward excitation or backward excitation.

4. The optical amplifier according to claim 1, wherein the excitation light combiner inputs the clad excitation light to the first rare-earth-doped fiber by one of forward excitation and backward excitation, and inputs the core excitation light to the second rare-earth-doped fiber by another of forward excitation and backward excitation.

5. The optical amplifier according to claim 1, further comprising: a core excitation light source configured to supply the core excitation light to the excitation light combiner; and a clad excitation light source configured to supply the clad excitation light to the excitation light combiner.

6. The optical amplifier according to claim 1, wherein
- each of the first rare-earth-doped fiber and the second rare-earth-doped fiber is a multi-core rare-earth-doped fiber including m cores, and the excitation light combiner inputs the core excitation light to m cores of the first rare-earth-doped fiber or the second rare-earth-doped fiber, where m is an integer equal to or greater than 2.

7. The optical amplifier according to claim 6, further comprising:
- a core excitation light source configured to supply the core excitation light to the excitation light combiner; and a clad excitation light source configured to supply the clad excitation light to the excitation light combiner, wherein
- the core excitation light source includes n excitation laser diodes and an n×m optical coupler configured to distribute output from the n laser diodes to m, where n is less than m.

8. The optical amplifier according to claim 1, wherein the controller outputs the control signal in such a way as to reduce an absolute value of a difference between the first voltage and the second voltage.

9. The optical amplifier according to claim 1, wherein the controller outputs the control signal when each of power of the core excitation light and power of the clad excitation light falls within a predetermined range.

10. An optical amplification method to be used by an optical amplifier that includes a first rare-earth-doped fiber and a second rare-earth-doped fiber connected in series with the first rare-earth-doped fiber and is configured to amplify a wavelength multiplexing optical signal, the optical amplification method comprising:
- inputting core excitation light to any of a core of the first rare-earth-doped fiber and a core of the second rare-earth-doped fiber;
- inputting clad excitation light to a clad of the first rare-earth-doped fiber, the clad excitation light having a wavelength different from that of the core excitation light;
- transmitting the wavelength multiplexing optical signal and the core excitation light and blocking the clad excitation light between the first rare-earth-doped fiber and the second rare-earth-doped fiber;
- outputting a first voltage that indicates optical power at a first wavelength of the wavelength multiplexing optical signal amplified and a second voltage that indicates optical power at a second wavelength of the wavelength multiplexing optical signal amplified; and outputting a control signal for controlling at least one of power of the core excitation light and power of the clad excitation light when an absolute value of a difference between the first voltage and the second voltage is equal to or greater than a predetermined threshold value.

11. The optical amplification method according to claim 10, wherein both the first rare-earth-doped fiber and the second rare-earth-doped fiber are erbium-doped fibers.

12. The optical amplification method according to claim 10, further comprising:

controlling, when an absolute value of a difference between the first voltage and the second voltage is equal to or greater than a predetermined threshold value, at least one of power of the core excitation light and power of the clad excitation light.

13. The optical amplification method according to claim 12, further comprising controlling at least one of power of the core excitation light and power of the clad excitation light in such a way as to reduce an absolute value of a difference between the first voltage and the second voltage.

14. A tangible and non-transitory recording medium storing a control program used by an optical amplifier configured to amplify a wavelength multiplexing optical signal, wherein the optical amplifier includes:

a first rare-earth-doped fiber;

a second rare-earth-doped fiber connected in series with the first rare-earth-doped fiber;

an excitation light combiner configured to input core excitation light to any of a core of the first rare-earth-doped fiber and a core of the second rare-earth-doped fiber and input clad excitation light to a clad of the first rare-earth-doped fiber, the clad excitation light having a wavelength different from that of the core excitation light;

an optical filter arranged between the first rare-earth-doped fiber and the second rare-earth-doped fiber and configured to transmit the wavelength multiplexing optical signal and the core excitation light and block the clad excitation light; and an optical monitor configured to output a first voltage that indicates optical power at a first wavelength of the wavelength multiplexing optical signal amplified and a second voltage that indicates optical power at a second wavelength of the wavelength multiplexing optical signal amplified, wherein the control program causes a computer of the optical amplifier to execute a procedure of outputting a control signal for controlling at least one of power of the core excitation light and power of the clad excitation light when an absolute value of a difference between the first voltage and the second voltage is equal to or greater than a predetermined threshold value.

15. The recording medium according to claim 14, wherein both the first rare-earth-doped fiber and the second rare-earth-doped fiber are erbium-doped fibers.

16. The recording medium according to claim 14, wherein the control program causes a computer of the optical amplifier to execute a procedure of outputting the control signal in such a way as to reduce an absolute value of a difference between the first voltage and the second voltage.

* * * * *